(12) United States Patent
Rekimoto

(10) Patent No.: US 8,903,197 B2
(45) Date of Patent: Dec. 2, 2014

(54) INFORMATION PROVIDING METHOD AND APPARATUS, INFORMATION DISPLAY METHOD AND MOBILE TERMINAL, PROGRAM, AND INFORMATION PROVIDING

(75) Inventor: Junichi Rekimoto, Kanagawa (JP)

(73) Assignee: Sony Corporation, Tokyo (JP)

(*) Notice: Subject to any disclaimer, the term of this patent is extended or adjusted under 35 U.S.C. 154(b) by 664 days.

(21) Appl. No.: 12/870,320

(22) Filed: Aug. 27, 2010

(65) Prior Publication Data

US 2011/0052083 A1 Mar. 3, 2011

(30) Foreign Application Priority Data

Sep. 2, 2009 (JP) ................. P2009-202264

(51) Int. Cl.
- *G06K 9/54* (2006.01)
- *G06K 9/60* (2006.01)
- *H04N 1/32* (2006.01)
- *H04N 1/00* (2006.01)

(52) U.S. Cl.
CPC ....... *H04N 1/00307* (2013.01); *H04N 1/32101* (2013.01); *H04N 1/32144* (2013.01); *H04N 2201/3253* (2013.01); *H04N 1/00244* (2013.01)
USPC .............................. 382/305; 701/426; 345/632

(58) Field of Classification Search
USPC .................. 382/103, 106, 181, 305; 701/426; 345/632, 633
See application file for complete search history.

(56) References Cited

U.S. PATENT DOCUMENTS

| | | | |
|---|---|---|---|
| 7,698,336 B2* | 4/2010 | Nath | 707/737 |
| 8,238,671 B1* | 8/2012 | Babenko et al. | 382/224 |
| 8,385,593 B2* | 2/2013 | Urbach et al. | 382/100 |
| 8,769,437 B2* | 7/2014 | Myllyla | 715/850 |
| 2005/0104976 A1* | 5/2005 | Currans | 348/231.5 |
| 2005/0162523 A1 | 7/2005 | Darrell et al. | |
| 2005/0185060 A1* | 8/2005 | Neven | 348/211.2 |
| 2006/0002590 A1* | 1/2006 | Borak | 382/104 |
| 2006/0114336 A1* | 6/2006 | Liu | 348/231.3 |
| 2006/0190812 A1* | 8/2006 | Ellenby et al. | 715/512 |
| 2007/0239847 A1* | 10/2007 | Takehara et al. | 709/217 |
| 2008/0140638 A1* | 6/2008 | Bruno | 707/4 |
| 2008/0147730 A1* | 6/2008 | Lee et al. | 707/104.1 |

(Continued)

FOREIGN PATENT DOCUMENTS

| | | |
|---|---|---|
| JP | 2008-139295 | 6/2008 |
| WO | WO 00/50919 A2 | 8/2000 |

(Continued)

OTHER PUBLICATIONS

European Search Report issued Nov. 10, 2010, in the Hague, in corresponding European Patent Application EP 10 17 4105.

*Primary Examiner* — Aaron W Carter
(74) *Attorney, Agent, or Firm* — Finnegan, Henderson, Farabow, Garrett & Dunner, LLP

(57) ABSTRACT

An information providing method includes a recognition step of recognizing an image-capture position, in the real world, at which a captured image was captured; a retrieval step of retrieving information that is associated with the image-capture position, which has been recognized in the recognition step, and the captured image; and a provision step of providing the information, which has been retrieved in the retrieval step, as overlay information that is to be displayed so as to be superimposed on the captured image.

17 Claims, 16 Drawing Sheets

(56) References Cited

U.S. PATENT DOCUMENTS

| | | | |
|---|---|---|---|
| 2008/0242316 A1* | 10/2008 | Wang et al. | 455/456.2 |
| 2008/0268876 A1* | 10/2008 | Gelfand et al. | 455/457 |
| 2008/0320036 A1* | 12/2008 | Winter | 707/103 R |
| 2009/0158206 A1* | 6/2009 | Myllyla | 715/804 |
| 2009/0324058 A1* | 12/2009 | Sandage et al. | 382/154 |
| 2009/0324103 A1* | 12/2009 | Gelfand et al. | 382/224 |
| 2010/0149399 A1* | 6/2010 | Mukai et al. | 348/333.02 |
| 2010/0176987 A1* | 7/2010 | Hoshizaki | 342/357.02 |
| 2010/0191459 A1* | 7/2010 | Carter et al. | 701/208 |
| 2010/0265177 A1* | 10/2010 | Fujimoto et al. | 345/162 |
| 2010/0290699 A1* | 11/2010 | Adam et al. | 382/155 |
| 2011/0052073 A1* | 3/2011 | Wallace et al. | 382/190 |
| 2011/0311140 A1* | 12/2011 | Urbach et al. | 382/182 |
| 2012/0020565 A1* | 1/2012 | Urbach et al. | 382/182 |
| 2012/0105581 A1* | 5/2012 | Berestov et al. | 348/43 |
| 2012/0121195 A1* | 5/2012 | Yadid et al. | 382/229 |
| 2012/0149395 A1* | 6/2012 | Azami et al. | 455/456.1 |
| 2012/0230539 A1* | 9/2012 | Calman et al. | 382/103 |
| 2012/0323930 A1* | 12/2012 | Kennberg et al. | 707/748 |
| 2013/0018881 A1* | 1/2013 | Bhatt | 707/736 |

FOREIGN PATENT DOCUMENTS

| | | |
|---|---|---|
| WO | WO 00/50919 A3 | 8/2000 |
| WO | WO 2007/021996 A2 | 2/2007 |
| WO | WO 2007/021996 A3 | 2/2007 |
| WO | WO 2008/076526 A1 | 6/2008 |

* cited by examiner

FIG. 9

| PANORAMA IMAGE | OVERLAY INFORMATION ITEM |
|---|---|
| PV1-1 | A BANK<br>BUSINESS HOURS ○○<br>⋮ |
| PV1-2 | ⋮ |
| PV1-3 | ⋮ |
| ⋮ | ⋮ |
| PV5-1 | BUSINESS HOURS ○○<br>NUMBER OF SHEETS XX<br>⋮ |
| PV5-2 | ○○ BURGER X YEN<br>○X BURGER Z YEN<br>○Y BURGER Y YEN<br>⋮ |
| PV5-3 | ⋮ |
| ⋮ | ⋮ |

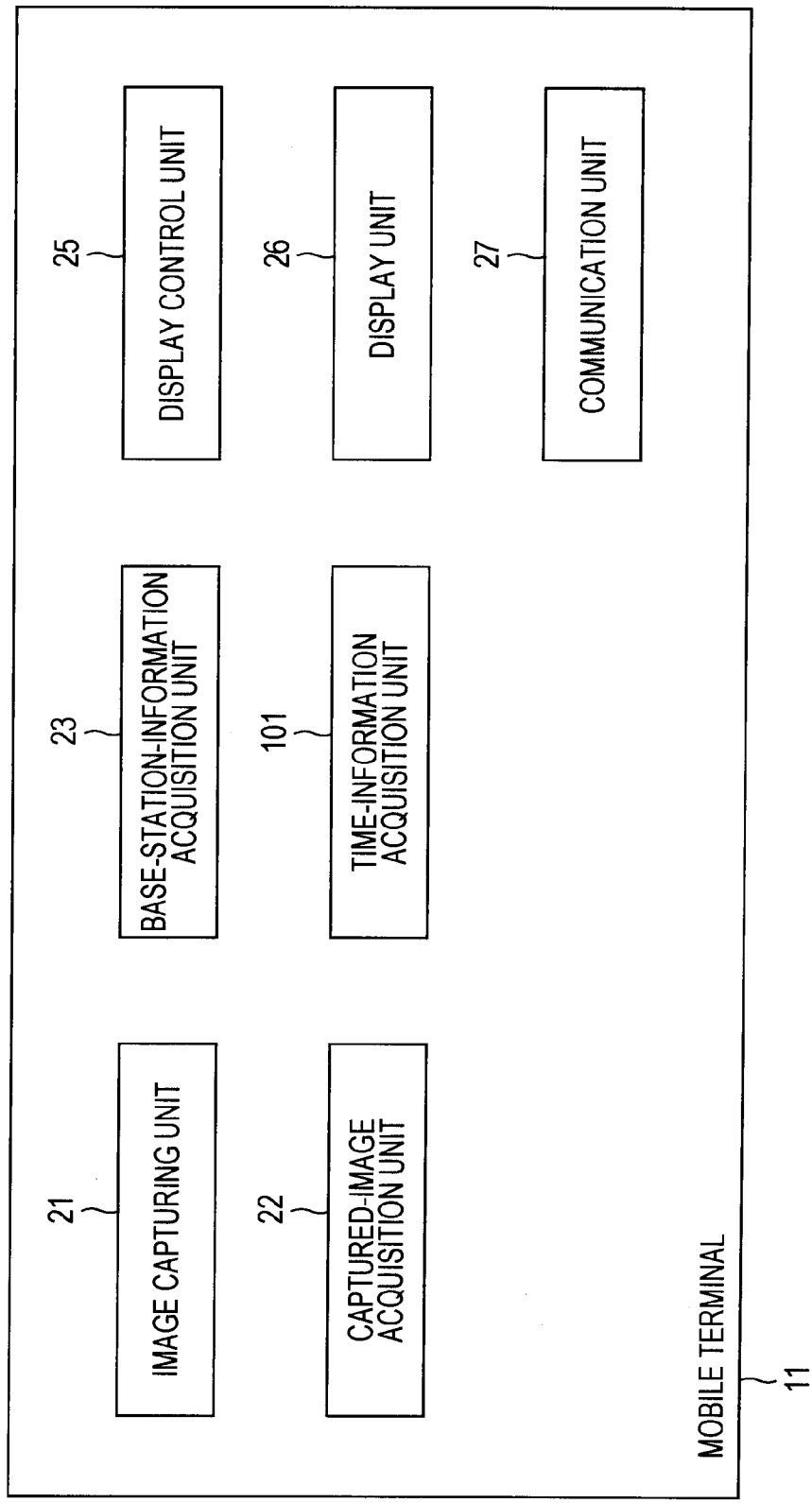

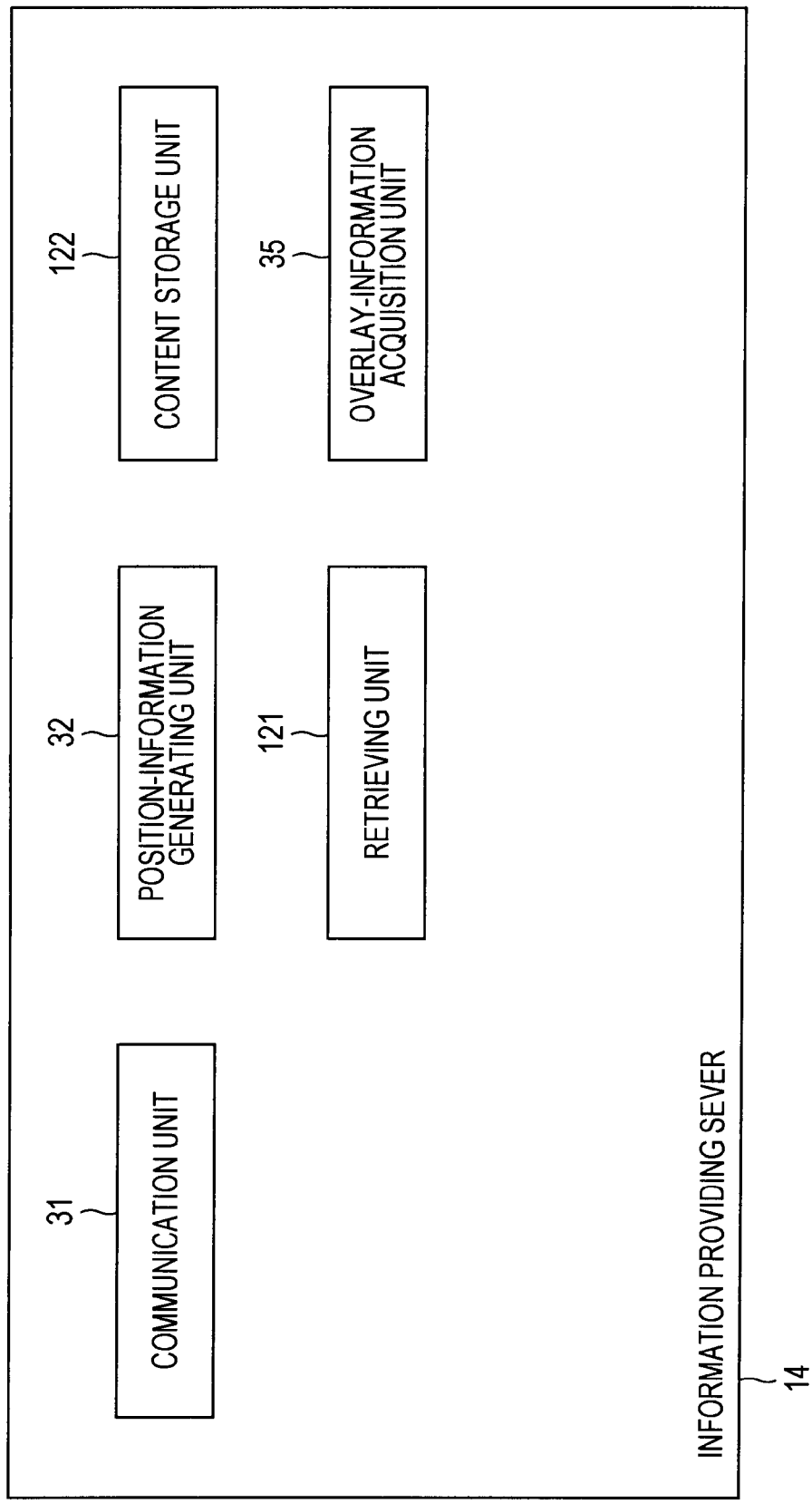

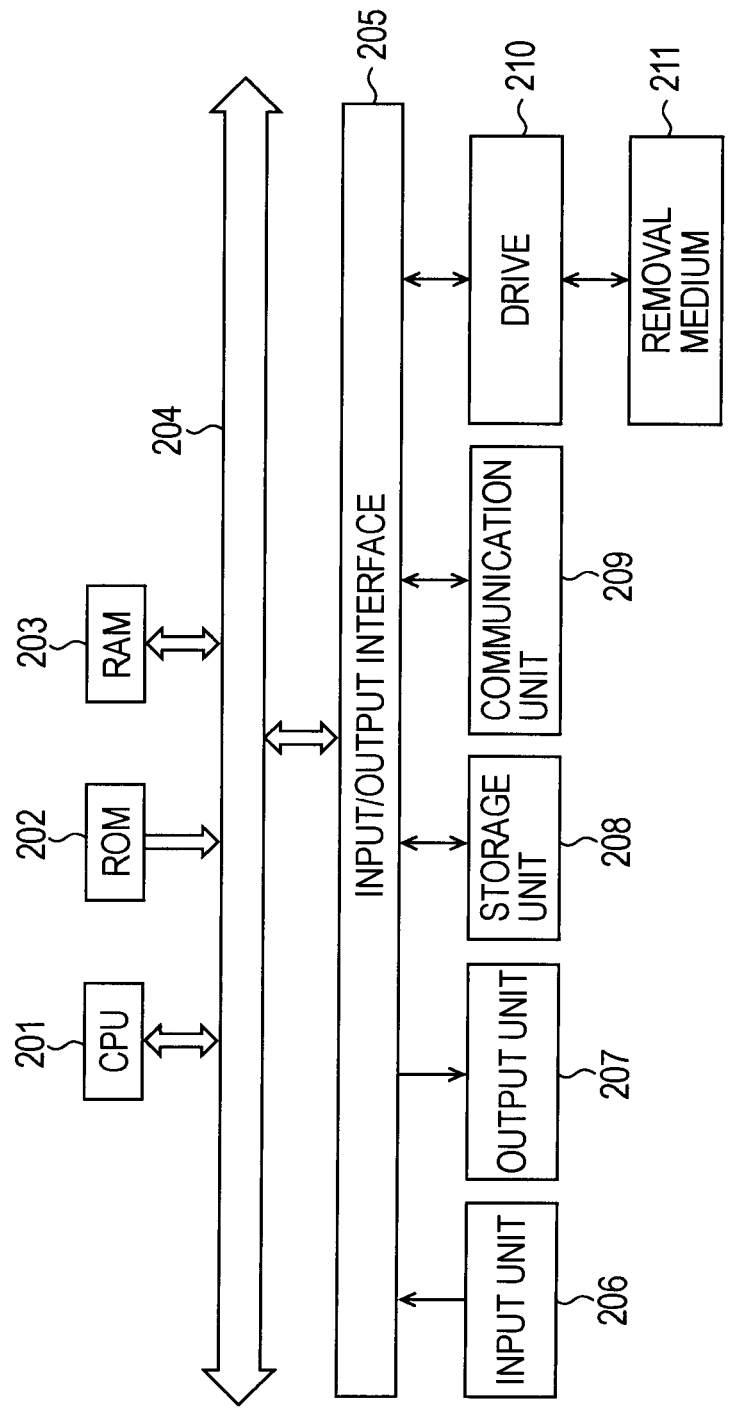

INFORMATION PROVIDING METHOD AND APPARATUS, INFORMATION DISPLAY METHOD AND MOBILE TERMINAL, PROGRAM, AND INFORMATION PROVIDING

BACKGROUND OF THE INVENTION

1. Field of the Invention

The present invention relates to an information providing method and apparatus, an information display method and a mobile terminal, a program, and an information providing system. More specifically, the present invention relates to an information providing method and apparatus, an information display method and a mobile terminal, a program, and an information providing system that can display more appropriate overlay information.

2. Description of the Related Art

In recent years, a technology for capturing an image of an object in the real world using a camera or the like to obtain a captured image as a result, and for displaying various types of information in such a manner that the various types of information is superimposed on the captured image has been coming along. Such a technology is called augmented reality or mixed reality. Note that, hereinafter, information that is displayed so as to be superimposed on a captured image is referred to as "overlay information". By applying the augmented reality to an electronic device with a display, a user can visually recognize overlay information that is displayed together with a captured image (for example, see Japanese Unexamined Patent Application Publication No. 2008-139295).

In order to realize the augmented reality, it is necessary to recognize a position (an image-capture position) at which a camera or the like exists and an image-capture direction. As a scheme for recognizing the image-capture position and the image-capture direction, a scheme (hereinafter, referred to as a "position recognition scheme") is common, in which the position (the image-capture position) at which a camera or the like exists is recognized using a global positioning system (GPS) or a wireless local area network (LAN), and in which the image-capture direction is recognized using a geomagnetic sensor.

SUMMARY OF THE INVENTION

However, when such a position recognition scheme is employed, there is a case, for example, in which it is difficult to display overlay information in such a manner that the overlay information associated with a store is accurately superimposed on the store included in a captured image. In other words, examples of such a case includes a case in which, although a user has captured an image of a building, information concerning a building in front of the building is displayed as overlay information. The reason for this is that, in the position recognition scheme, it is difficult to accurately recognize the position at which a camera or the like exists and the image-capture direction.

More specifically, for example, when a position recognition scheme using the GPS is employed, position recognition accuracy in an outdoor location where the skyline is not obscured is high because a radio wave emitted from an artificial satellite can be easily received in the outdoor location. However, position recognition accuracy in an outdoor location where the skyline is obscured, such as a location where there are a large number of buildings, or in an indoor location is markedly reduced because it is difficult to receive the radio wave in the outdoor location or in the indoor location. As a result, it is difficult to accurately recognize the position at which a camera or the like exists in the outdoor location where the skyline is obscured or in the indoor location.

When a position recognition scheme using a wireless LAN is employed, the position recognition accuracy in the outdoor location where the skyline is obscured or in the indoor location is substantially equal to the position recognition accuracy in the outdoor location where the skyline is not obscured. However, when the position recognition scheme using a wireless LAN is employed, sensitivity with which the radio wave is received is lower than sensitivity with which the radio wave is received employing the position recognition scheme using the GPS, and the position recognition accuracy is as low as 30 m. Accordingly, when the position recognition scheme using a wireless LAN is employed, regardless of being in the outdoor location where the skyline is not obscured or being in other different locations, it is difficult to accurately recognize the position in which a camera or the like exists.

Furthermore, it is difficult to accurately recognize the image-capture direction using a geomagnetic sensor. As a result, it is difficult to provide accurate overlay information for a user using a position recognition scheme.

Moreover, overlay information can also be applied to technologies other than the augmented reality. For example, when an image of a poster that is pasted on a street wall is captured, information concerning the poster can be displayed as overlay information so as to be superimposed on the captured image. However, in this case, the poster and an item that is to be displayed so as to be superimposed on the poster have a one-to-one relationship. Accordingly, it is difficult to provide appropriate overlay information that is suitable for each place.

The present invention has been made in view of such circumstances, and makes it possible to display more appropriate overlay information.

An information providing method according to an embodiment of the present invention includes the following: a recognition step of recognizing an image-capture position, in the real world, at which a captured image was captured; a retrieval step of retrieving information that is associated with the image-capture position, which has been recognized in the recognition step, and the captured image; and a provision step of providing the information, which has been retrieved in the retrieval step, as overlay information that is to be displayed so as to be superimposed on the captured image.

The information can further be associated with a time. In the retrieval step, the information can be retrieved on the basis of a time at which the captured image was captured, in addition to the image-capture position and the captured image.

The retrieval step can include the following: an image retrieval step of retrieving images that are to be compared with the captured image, as retrieved images, from among a plurality of images corresponding to individual positions in the real world, on the basis of the image-capture position that has been recognized in the recognition step; a comparison step of comparing the retrieved images with the captured image; and an information retrieval step of retrieving, as the information, information that is associated with one of the retrieved images, the retrieved image coinciding with the captured image as a result of comparison in the comparison step.

In the recognition step, in addition to the image-capture position, an image-capture direction from which the captured image was captured can be recognized. In the image retrieval step, images can be retrieved as the retrieved images on the basis of the image-capture direction in addition to the image-capture position.

The captured image can be an image that is obtained by performing image capture at the image-capture position in the real world. In the image retrieval step, images can be retrieved as the retrieved images on the basis of each zoom magnification with which the captured image was captured, in addition to the image-capture position.

An information providing apparatus and a program according to embodiments of the present invention are an apparatus and a program corresponding to the above-described information providing method according to the embodiment of the present invention.

In the information providing method and apparatus, and the program according to the embodiments of the present invention, an image-capture position, in the real world, at which a captured image was captured is recognized. Information that is associated with the recognized image-capture position and the captured image is retrieved. The retrieved information is provided as overlay information that is to be displayed so as to be superimposed on the captured image.

An information display method according to an embodiment of the present invention includes the following: an image acquisition step of acquiring a captured image that is obtained by performing image capture at an image-capture position in the real world; an information acquisition step of acquiring information concerning the image-capture position; a communication step of transmitting the captured image and the information concerning the image-capture position to an information providing apparatus, and of receiving overlay information that is associated with the captured image and the information concerning the image-capture position from the information providing apparatus; and a display step of displaying the overlay information, which has been received in the communication step, in such a manner that the overlay information is superimposed on the captured image.

In the communication step, in addition to the captured image and the information concerning the image-capture position, time information concerning a time at which the captured image was captured can further be transmitted to the information providing apparatus. Overlay information that is further associated with the time information in addition to the captured image and the information concerning the image-capture position can be received from the information providing apparatus.

In the communication step, direction information concerning an image-capture direction from which the captured image was captured can further be transmitted to the information providing apparatus.

The information display method can further include a zoom-magnification acquisition step of acquiring a zoom magnification with which the captured image was captured. In the communication step, in addition to the captured image and the information concerning the image-capture position, the zoom magnification can further be transmitted to the information providing apparatus. Overlay information that is further associated with the zoom magnification in addition to the captured image and the information concerning the image-capture position can be received from the information providing apparatus.

A mobile terminal and a program according to embodiments of the present invention are a mobile terminal and a program corresponding to the above-described information display method according to the embodiment of the present invention.

In the information display method and the mobile terminal, and the program according to the embodiments of the present invention, a captured image that is obtained by performing image capture at an image-capture position in the real world is acquired. Information concerning the image-capture position is acquired. The captured image and the information concerning the image-capture position are transmitted to an information providing apparatus. Overlay information that is associated with the captured image and the information concerning the image-capture position are received from the information providing apparatus. The received overlay information is displayed so as to be superimposed on the captured image.

An information providing system according to an embodiment of the present invention includes the following: an information providing apparatus configured to provide, for a mobile terminal, overlay information that is to be combined with a captured image; and the mobile terminal configured to combine the overlay information with the captured image to obtain a combined image, and configured to display the combined image. The mobile terminal includes the following: image acquiring means for acquiring the captured image that is obtained by performing image capture at an image-capture position in the real world; display means for displaying the overlay information in such a manner that the overlay information is superimposed on the captured image; and first communicating means for transmitting the captured image and information concerning the image-capture position to the information providing apparatus, and for receiving the overlay information from the information providing apparatus. The information providing apparatus includes the following: recognizing means for recognizing the image-capture position on the basis of the information concerning the image-capture position, which has been received from the mobile terminal; retrieving means for retrieving information that is associated with the image-capture position, which has been recognized by the recognizing means, and the captured image; and second communicating means for transmitting, to the mobile terminal, the information, which has been retrieved by the retrieving means, as the overlay information item that is to be displayed so as to be superimposed on the captured image.

In the information providing system according to the embodiment of the present invention, a captured image that is obtained by performing image capture at an image-capture position in the real world is acquired by the mobile terminal. Overlay information is displayed by the mobile terminal so as to be superimposed on the captured image. The captured image and information that is associated with the image-capture position are transmitted by the mobile terminal to the information providing apparatus. The overlay information is received by the mobile terminal from the information providing apparatus. The image-capture position is recognized by the information providing apparatus on the basis of the information concerning the image-capture position that has been received from the mobile terminal. The information that is associated with the recognized image-capture position and the captured image is retrieved by the information providing apparatus. The retrieved information is transmitted by the information providing apparatus to the mobile terminal as the overlay information that is to be displayed so as to be superimposed on the captured image.

As described above, according to the embodiments of the present invention, more appropriate overlay information can be displayed.

BRIEF DESCRIPTION OF THE DRAWINGS

FIG. 9 is a table for explaining specific examples of overlay information items that are associated with panorama images;

FIG. 11 is a functional block diagram of an example of a functional configuration of a mobile terminal according to a second embodiment;

FIG. 12 is a functional block diagram of an example of a functional configuration of an information providing sever according to the second embodiment;

FIG. 18 is a block diagram of an example of a hardware configuration of an information processing apparatus to which the present invention is applied.

DESCRIPTION OF THE PREFERRED EMBODIMENTS

Two embodiments (hereinafter, referred to as a "first embodiment" and a "second embodiment") will be described as embodiments of the present invention in the following order of section headings:

1. First Embodiment (an example in which an overlay information item is associated with a panorama image)
2. Second Embodiment (an example in which an overlay information item is associated with an image of a poster or the like)

Hereafter, the embodiments of the present invention will be described with reference to the accompanying drawings.

1. First Embodiment

Figure 1:
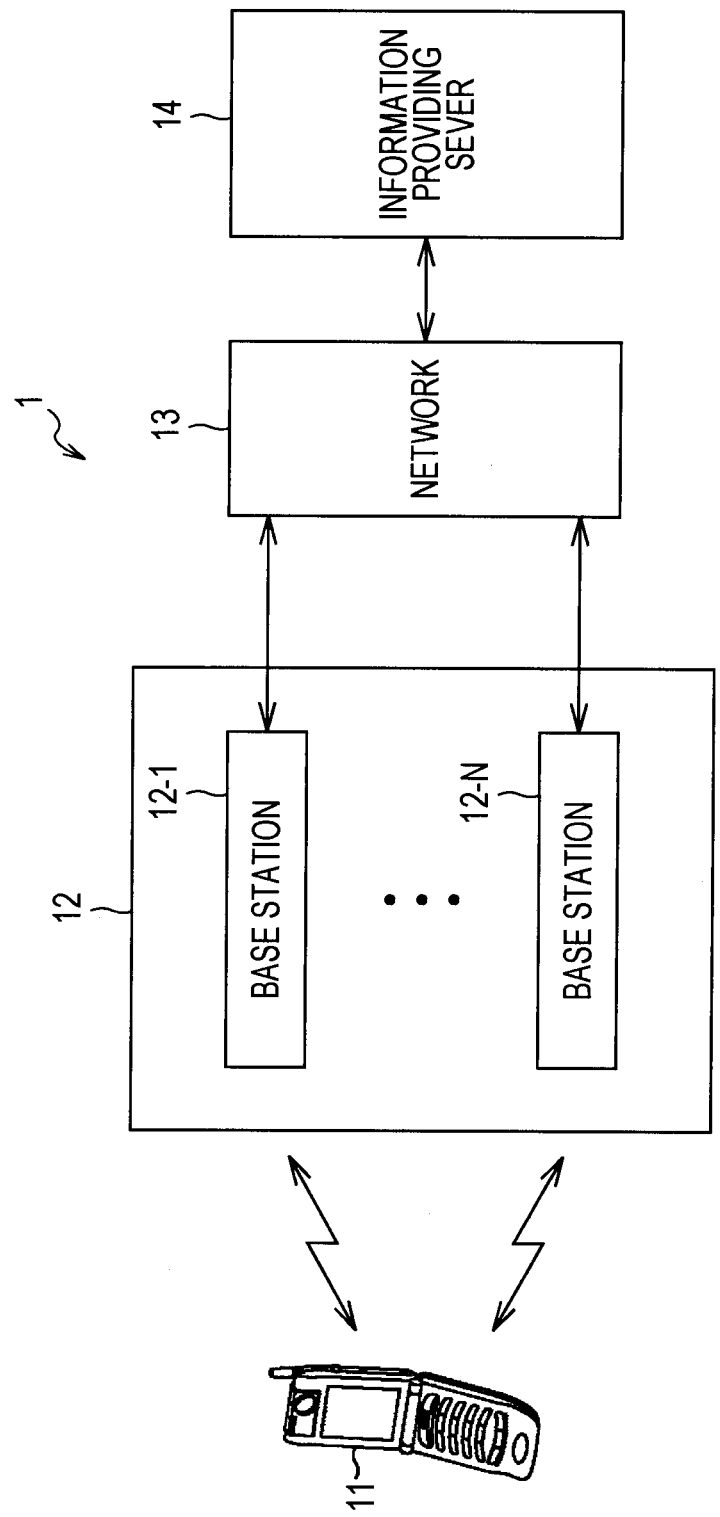
FIG. 1 is a block diagram of a configuration of an information providing system according to an embodiment, to which the present invention is applied.

Example of Configuration of Information Providing System 1 to which Present Embodiment is Applied FIG. 1 is a block diagram of a configuration of an information providing system to which the first embodiment of the present invention is applied.

An information providing system 1 illustrated in FIG. 1 includes a mobile terminal 11, base stations 12-1 to 12-N (N is any integral value that is equal to or larger than one), a network 13, and an information providing server 14.

Note that, hereinafter, when it is not necessary to distinguish the base stations 12-1 to 12-N from one another, the base stations 12-1 to 12-N are collectively referred to as a "base station 12".

The mobile terminal 11 is a terminal that can be easily carried by a user, such as a mobile phone. When the mobile terminal 11 is indoors or even outdoors, the mobile terminal 11 can transmit and receive various types of information items between the mobile terminal 11 and an information processing apparatus that is connected to the network 13, such as the information providing server 14.

More specifically, for example, regarding transmission of a transmission information item from the mobile terminal 11 to the information providing server 14, the transmission information item is wirelessly transmitted to the base station 12-K (K is one of the integral values of 1 to N) that is closest to the mobile terminal 11 among the base stations 12-1 to 12-N constituting a wireless LAN. The transmission information item received by the base station 12-K is transmitted via the network 13 to the information providing server 14.

The information providing server 14 serving as an information providing apparatus is a server that provides various types of service. Regarding transmission of a transmission information item from the information providing server 14 to the mobile terminal 11, the transmission information item is transmitted via the network 13 to the base station 12-K. The transmission information item received by the base station 12-K is wirelessly transmitted to the mobile terminal 11.

Note that the network 13 in the first embodiment is configured, for example, using the Internet. However, the configuration of the Internet is not particularly limited thereto. Furthermore, the base station 12 is also not particularly limited thereto as long as it is configured so as to be connectable to the network 13. Moreover, in the first embodiment, because the wireless LAN is employed to recognize the position of the mobile terminal 11, the base station 12 capable of wirelessly communicating with the mobile terminal 11 exists. However, in a case in which, for example, the GPS is employed to recognize the position of the mobile terminal 11 and in which the mobile terminal 11 and the network 13 are directly connected to each other, the base station 12 can be omitted.

Example of Configuration of Mobile Terminal 11

Figure 2:
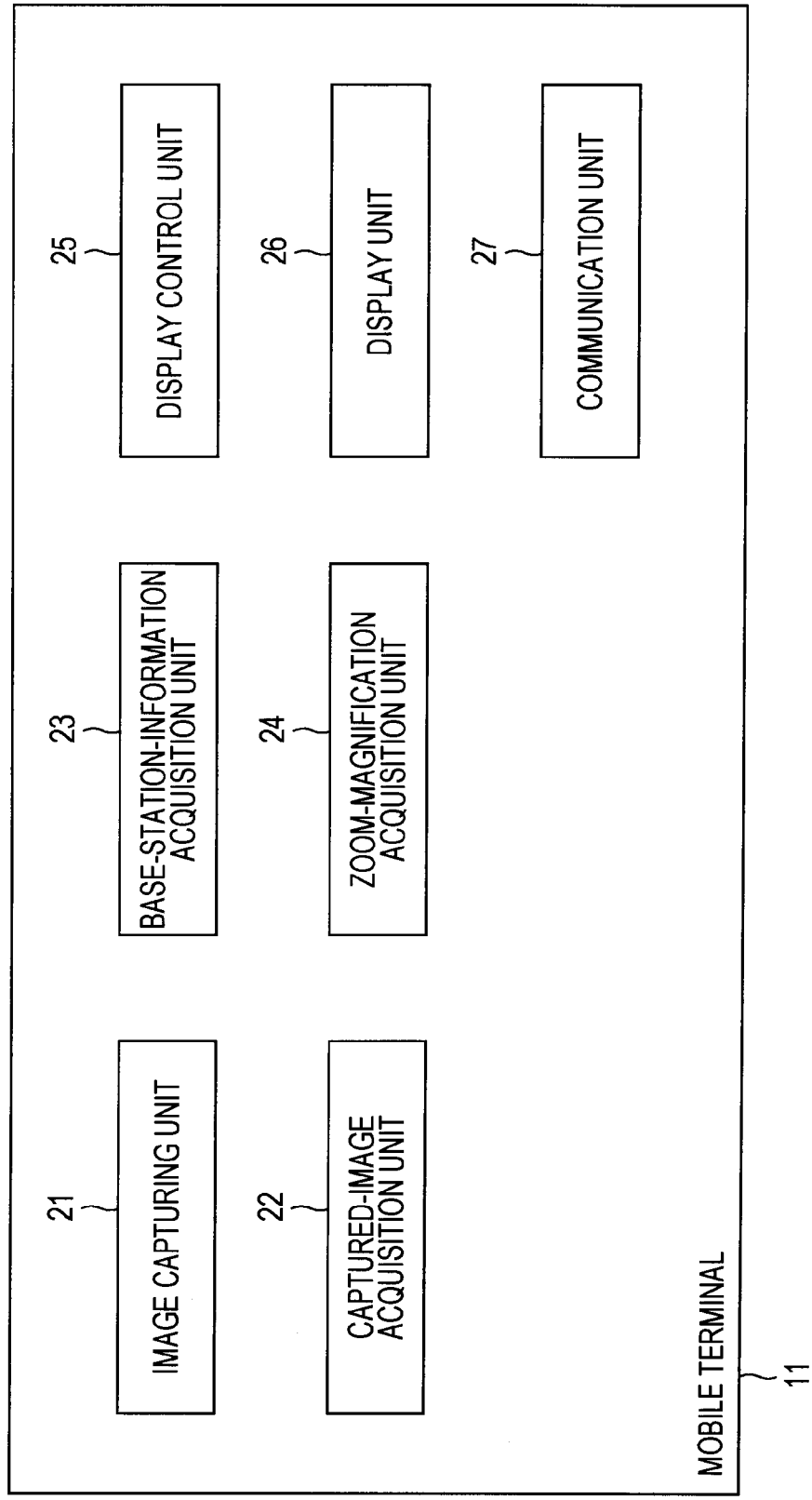
FIG. 2 is a functional block diagram of an example of a functional configuration of a mobile terminal according to a first embodiment.

FIG. 2 is a functional block diagram of an example of a functional configuration of the mobile terminal 11 included in the information providing system 1 illustrated in FIG. 1.

The mobile terminal 11 illustrated in FIG. 2 includes an image capturing unit 21, a captured-image acquisition unit 22, a base-station-information acquisition unit 23, a zoom-magnification acquisition unit 24, a display control unit 25, a display unit 26, and a communication unit 27.

The image capturing unit 21 captures an image of an object such as a landscape, for example, at a predetermined position in the real world.

The captured-image acquisition unit 22 acquires the captured image that has been captured by the image capturing unit 21.

The base-station-information acquisition unit 23 acquires an information item (hereinafter, referred to as a "base-station information item") concerning the base station 12-K that is closest to the mobile terminal 11.

In the first embodiment, position recognition is performed using the wireless LAN. In other words, utilizing a property that the strength of an electric field of a radio wave on a receiving side decreases with a wireless communication distance, a distance between a transmitting side whose installation position is already given and the receiving side is recognized. Using the recognized distance, the position of the receiving side whose current position is not given is recognized. Accordingly, in order to recognize a distance between the base station 12-K and the mobile terminal 11 using the wireless LAN, an installation position of the base station 12-K and the strength of an electric field of a radio wave emitted from the base station 12-K are necessary. For example, in the first embodiment, a base-station identification (ID) by which a base station can be uniquely identified is assigned to each of the base stations 12-1 to 12-N. In other words, the base station 12 whose installation position is already given can be identified by the base-station ID. Accordingly, the base-station ID is employed as an information item for determining the installation position of the base station 12. Thus, in the first embodiment, the base-station ID of the base station 12-K and an information item concerning the strength of an electric field of a radio wave emitted from the base station 12-K are acquired as the base-station information item by the base-station-information acquisition unit 23.

The communication unit 27 transmits the captured image, which has been acquired by the captured-image acquisition unit 22, and the base-station information item, which has been acquired by the base-station-information acquisition unit 23, to the information providing server 14. Furthermore, the communication unit 27 receives an overlay information item from the information providing server 14.

The display control unit 25 superimposes the overlay information item, which has been received by the communication unit 27, on the captured image, which has been acquired by the captured-image acquisition unit 22, to obtain a combined image as a result. The display control unit 25 causes the display unit 26 to display the combined image. In other words, the display unit 26 displays, together with the captured image, the overlay information item that is superimposed on the captured image.

The zoom-magnification acquisition unit 24 acquires a zoom magnification with which the image of the object was captured by the image capturing unit 21. The zoom magnification, together with the captured image and the base-station information item, is provided from the communication unit 27 to the information providing server 14.

Example of Configuration of Information Providing Server 14

Figure 3:
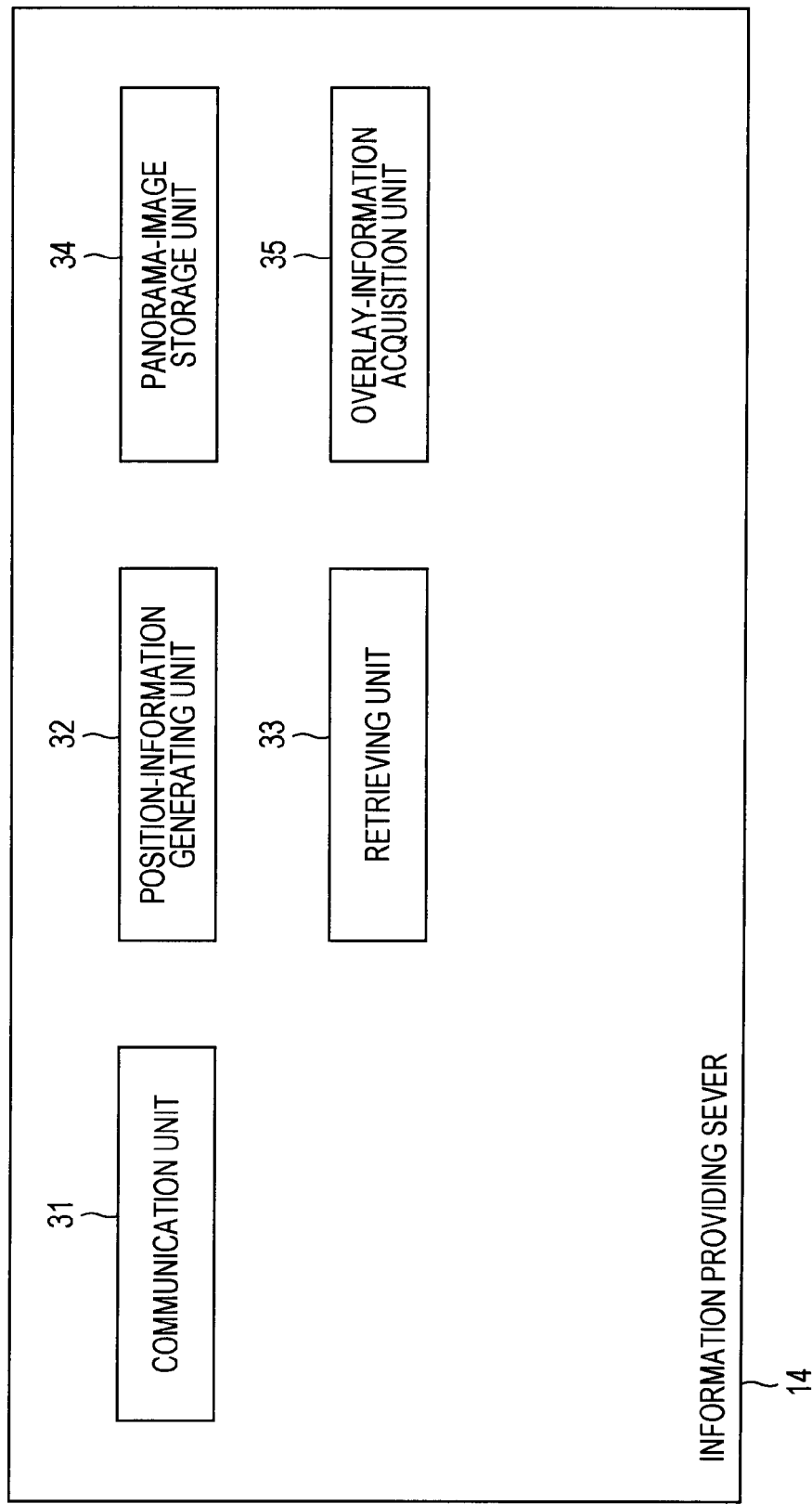
FIG. 3 is a functional block diagram of an example of a functional configuration of an information providing sever according to the first embodiment.

FIG. 3 is a functional block diagram of an example of a functional configuration of the information providing server 14 included in the information providing system 1 illustrated in FIG. 1.

The information providing server 14 illustrated in FIG. 3 includes a communication unit 31, a position-information generating unit 32, a retrieving unit 33, a panorama-image storage unit 34, and an overlay-information acquisition unit 35.

The communication unit 31 communicates with the communication unit 27 of the mobile terminal 11, and receives information items that have been transmitted from the mobile terminal 11, such as the captured image, the base-station information item, and the zoom magnification.

The position-information generating unit 32 generates, on the basis of the base-station information item that has been received by the communication unit 31 and that has been transmitted from the mobile terminal 11, a position information item indicating a position at which the mobile terminal 11 exists. In other words, as described above, the base-station information item includes the base-station ID corresponding to the installation position of the base station 12-K, and the strength of the electric field of the radio wave, which was emitted from the base station 12-K, in the mobile terminal 11. The position-information generating unit 32 detects an already given installation position corresponding to the base-station ID, and calculates a distance from the installation position from the strength of the electric field, thereby recognizing the position (the current position) at which the mobile terminal 11 exists. The position-information generating unit 32 generates a position information item as a result of recognition.

The retrieving unit 33 retrieves, on the basis of the position information item that has been generated in the position-information generating unit 32, images that are to be compared with the captured image which has been received by the communication unit 31 from among a plurality of images corresponding to individual positions in the real world, thereby obtaining retrieved images.

The retrieved images are images that can be associated with overlay information items, which are described below. For example, in the first embodiment, panorama images that are stored in the gradation-voltage generating unit 34 are used as the retrieved images. A panorama image is a captured image that was captured so that all surroundings (in a 360-degree area) around an image-capture position can be presented. In other words, in the panorama-image storage unit 34, a plurality of panorama images that are obtained as results of individually capturing images at a plurality of positions in the real world are stored in advance. Furthermore, in the panorama-image storage unit 34, a plurality of panorama images that are obtained as results of capturing images with a plurality of zoom magnifications at each of the plurality of image-capture positions. In other words, in the panorama-image storage unit 34, a plurality of panorama images having a layered structure in which layers correspond to the zoom magnifications are stored for each of the plurality of positions in the real world.

The retrieving unit 33 retrieves a panorama image that was captured with a zoom magnification which is the same as or close to the zoom magnification received by the communication unit 31 and that was captured at the position indicated by the position information item which has been generated by the position-information generating unit 32, i.e., a position that is the same as or in the vicinity of an image-capture position at which the panorama image was captured, from among the panorama images that are stored in the panorama-image storage unit 34. Then, the retrieving unit 33 performs a matching process of performing matching between the captured image that has been received by the communication unit 31 and individual areas of the panorama images that have been retrieved from the panorama-image storage unit 34. For example, the retrieving unit 33 detects, as coincident points, image feature points of the individual areas of the panorama images that coincide with image feature points of the captured image. The retrieving unit 33 identifies an area (an image) as the captured image from among the panorama images. Note that, hereinafter, a panorama image (a retrieved image) which has been identified as the captured image by the matching process performed by the retrieving unit 33 is referred to as a "matching image". The matching image or information for identifying the matching image is used as a matching result.

The overlay-information acquisition unit 35 acquires, on the basis of the matching result that is obtained by the retrieving unit 33, an overlay information item that is associated with the matching image. For example, in the first embodiment, a predetermined overlay information item is associated with each of the areas of the individual panorama images that are stored in the panorama-image storage unit 34. The overlay-information acquisition unit 35 acquires an overlay information item that is associated with the matching image from the panorama-image storage unit 34.

Various information items can be employed as overlay information items. Accordingly, various types of service can be provided for the user.

For example, navigation information items can be employed as overlay information items. More specifically, for example, a ranking information item concerning a ranking assigned to a restaurant that can be retrieved on the Internet can be used as an overlay information item. In this case, when the user has captured an image of a specific restaurant with a camera or the like, on a display of the camera or the like, not only the image of the specific restaurant is displayed, but also the ranking assigned to the restaurant is displayed as an overlay information item so as to be superimposed on the image of the specific restaurant. Accordingly, the user can visually recognize the ranking information item as if the ranking information were directly posted on the restaurant in the real world.

Furthermore, for example, communication information items concerning communication among users can be employed as overlay information items. More specifically, for example, a word-of-mouth information item concerning a restaurant that can be retrieved on the Internet can be used as an overlay information item. In this case, when the user has captured an image of a specific restaurant with a camera or the like, on a display of the camera or the like, not only the image of the specific restaurant is displayed, but also a word-of-mouth information item concerning the restaurant is displayed as an overlay information item so as to be superimposed on the image of the specific restaurant. Accordingly, the user can visually recognize a user-level raw information item such as "both taste of food and service of this restaurant are excellent".

Moreover, for example, one overlay information item can be associated with each of stores in the real world. In this case, every time the user changes the angle and captures an image, a store included in the captured image differs. An overlay information item that is displayed on the captured image differs with the store. In this manner, the overlay information item can be caused to differ with the image-capture position or an object included in the captured image.

The communication unit 31 transmits the overlay information item, which has been acquired by the overlay-information acquisition unit 35, to the communication unit 27 of the mobile terminal 11. As described above, the mobile terminal 11 displays the overlay information item in such a manner that the overlay information item is superimposed on the captured image.

In this manner, the information providing server 14 narrows down, using position recognition, the panorama images that are targets to be subjected to the matching process using the captured image. After that, the information providing server 14 performs the matching process on the panorama images. For example, when the position at which the mobile terminal 11 exists is recognized as a position in the vicinity of the intersection in front of the statue of Hachiko in Shibuya, a panorama image including the surroundings of the intersection in front of the statue of Hachiko in Shibuya is exclusively selected as a target to be subjected to the matching process using the captured image. Accordingly, the amount of data that is necessary for the matching process can be reduced, and the time taken to perform the matching process can be reduced.

Note that, places at which individual functional blocks of the functional block diagram of the mobile terminal 11 illustrated in FIG. 2 and of the functional block diagram of the information providing server 14 in FIG. 3 exist may be located in the mobile terminal 11, in the information providing server 14, or in an information processing apparatus (not illustrated) on the network.

Overlay-Information Display Process Performed by Mobile Terminal 11

Next, a process (hereinafter, referred to as an "overlay-information display process") that is performed by the mobile terminal 11 will be described with reference to FIG. 4.

Figure 4:
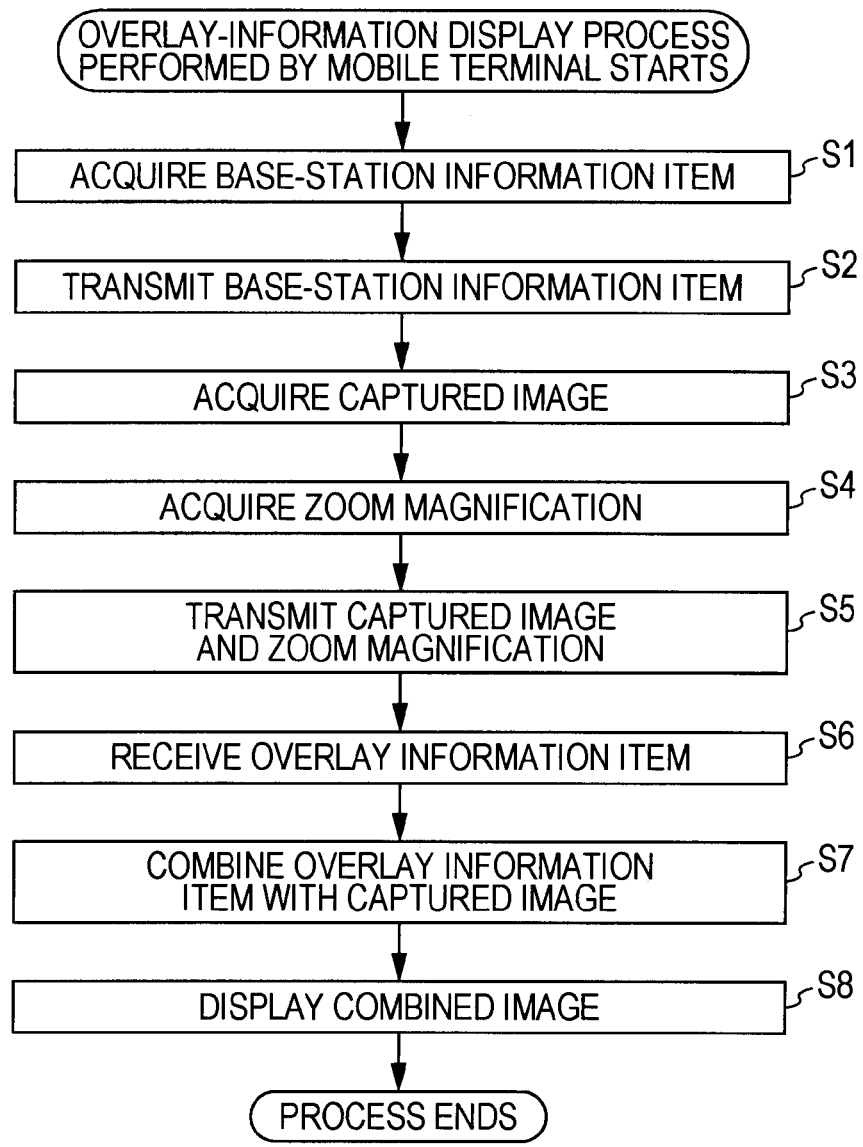
FIG. 4 is a flowchart for explaining an example of an overlay-information display process that is performed by the mobile terminal.

FIG. 4 is a flowchart for explaining an example of the overlay-information display process performed by the mobile terminal 11.

In step S1, when a predetermined operation is performed by the user, the base-station-information acquisition unit 23 of the mobile terminal 11 acquires a base-station information item. In other words, the communication unit 27 communicates with the base station 12-K that is closest to the mobile terminal 11, and receives a signal. The base-station-information acquisition unit 23 serving as information acquiring means acquires a base-station information item on the basis of the received signal.

Figure 5:
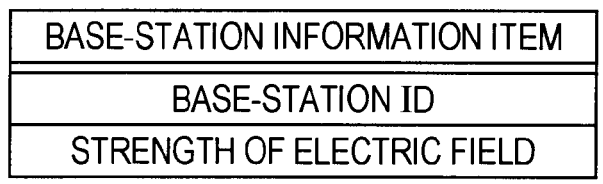
FIG. 5 is an illustration of an example of a base-station information item.

FIG. 5 is an illustration of an example of the base-station information item.

As illustrated in FIG. 5, the base-station information item includes a base-station ID and the strength of an electric field of a radio wave. The base-station ID is a base-station identification information item that is assigned as a specific information item to each of the base stations 12-1 to 12-N. The base station 12 can be uniquely identified by the base-station ID. Accordingly, the installation position of the base station 12-K that transmitted the base-station ID can be determined on the basis of the base-station ID that the mobile terminal 11 has received. Furthermore, a distance between the mobile terminal 11 and the base station 12-K that transmitted the base-station ID can be calculated from the strength, which has been received by the mobile terminal 11, of an electric field of a radio wave emitted from the base station 12-K. Accordingly, the distance from the base station 12-K, whose installation position is already given, to the mobile terminal 11 can be determined on the basis of the base-station information item that the mobile terminal 11 has received.

In step S2, the communication unit 27 transmits the base-station information item. In other words, the communication unit 27 transmits the base-station information item, which has been acquired by the base-station-information acquisition unit 23 in step S1, to the information providing server 14.

Then, as described below with reference to FIG. 8, the information providing server 14 receives the base-station information item, and generates a position information item concerning the position of the mobile terminal 11 on the basis of the base-station information item (see steps S21 and S22 illustrated in FIG. 8). In other words, the base-station information item is an information item indicating a predetermined position at which an image of an object is captured.

Note that the processes in steps S1 and S2 may be performed after processes in steps S3 and S4, which are described below, are performed. Furthermore, the base-station information item may be transmitted together with the captured image and a zoom magnification in step S5.

Meanwhile, in the mobile terminal 11, in step S3, the image capturing unit 21 captures an image of a predetermined object at the predetermined position in accordance with a user operation. The captured-image acquisition unit 22 acquires the captured image that has been captured by the image capturing unit 21.

In step S4, the zoom-magnification acquisition unit 24 acquires a zoom magnification. In other words, the zoom-magnification acquisition unit 24 acquires a zoom magnification that was specified by the user when the captured image was captured by the image capturing unit 21.

In step S5, the communication unit 27 transmits the captured image and the zoom magnification. In other words, the communication unit 27 transmits the captured image and the zoom magnification, which have been acquired by the captured-image acquisition unit 22 and the zoom-magnification acquisition unit 24 in steps S3 and S4, respectively, to the information providing server 14.

Then, as described below with reference to FIG. 8, the information providing server 14 receives the captured image and the zoom magnification. The information providing server 14 acquires an overlay information item using the captured image, the zoom magnification, and the above-described position information item, and transmits the overlay information item to the mobile terminal 11 (see steps S23 to S27 illustrated in FIG. 8).

In the mobile terminal 11, in step S6, the communication unit 27 receives the overlay information item, which has been transmitted from the information providing server 14. Note that, when the communication unit 27 receives no overlay information item within a fixed time after the communication unit 27 has transmitted the captured image, it is determined that a certain error occurs, and the overlay-information display process is forcibly terminated.

In step S7, the display control unit 25 combines the overlay information item with the captured image to obtain a combined image.

In step S8, the display unit 26 displays the combined image. In other words, the display unit 26 displays the combined image that is obtained by superimposing the overlay information item on the captured image in accordance with control performed by the display control unit 25 in step S7.

Accordingly, the overlay-information display process performed by the mobile terminal 11 finishes.

Here, specific examples of the processes in steps S7 and S8 illustrated in FIG. 4 will be described with reference to FIGS. 6 and 7.

Figure 6:
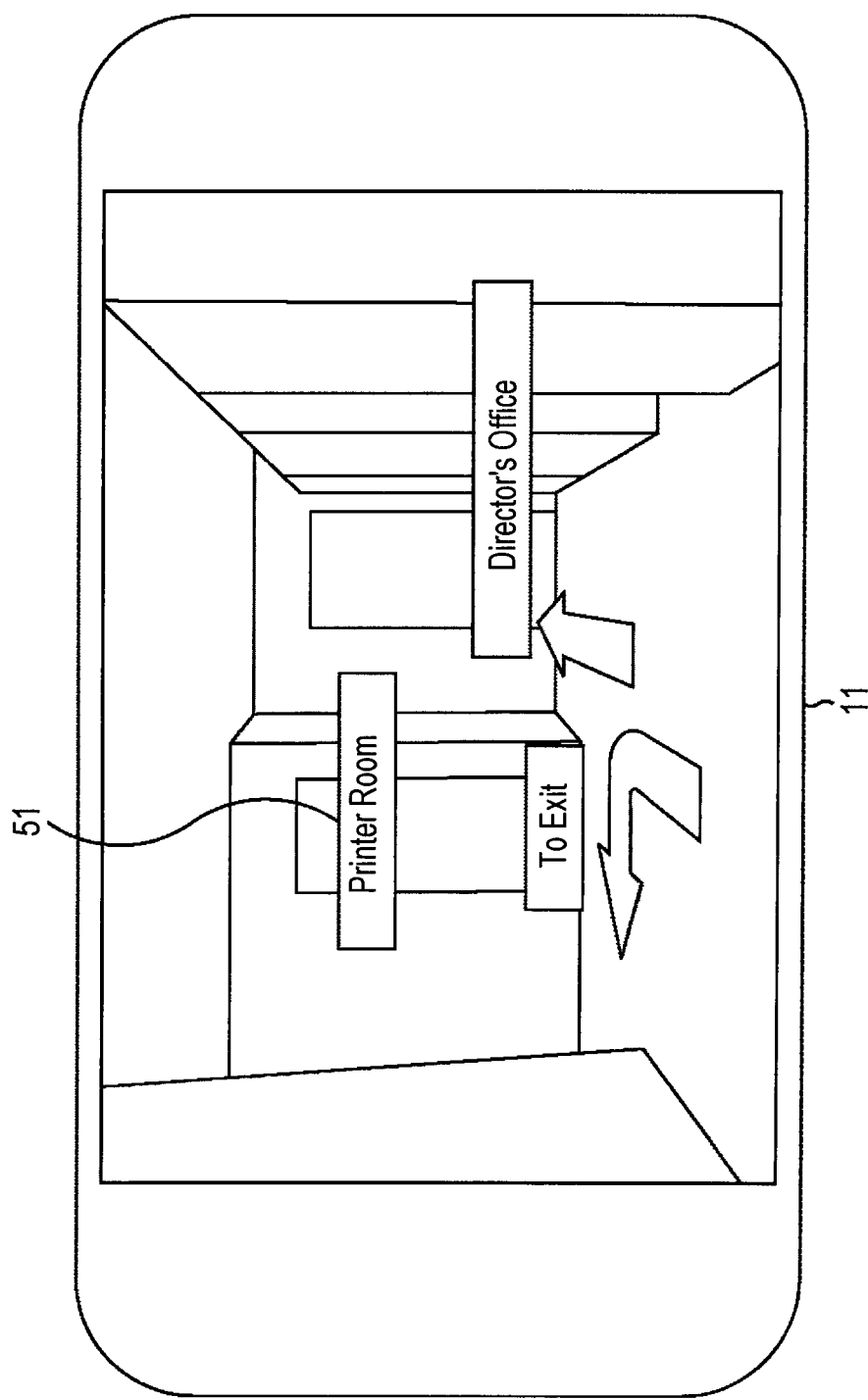
FIG. 6 is an illustration for explaining an example of display in which overlay information items are superimposed on a captured image.

FIG. 6 is an illustration for explaining an example of display in which overlay information items are superimposed on a captured image.

In the example illustrated in FIG. 6, the user carrying the mobile terminal 11 is indoors (for example, in an office). Furthermore, navigation information items are employed as overlay information items. More specifically, for example, guidance information items concerning the inside of the office are used as overlay information items. In the example, the user captures an image of the inside of the office with the mobile terminal 11 to obtain a captured image as a result. Individual guidance information items 51 of "Printer Room", "To Exit", and "Director's Office" are displayed so as to be superimposed on the captured image. Accordingly, the user can visually recognize the guidance information items 51 as if the guidance information items 51 were directly posted inside the office in the real world, and can take action. Because the overlay information items are displayed, the user can acquire information items indicating that a room which is located at the end of a hallway when the user sees the office from the current position is a director's office (Director's Office), that a room which is located closer to the user than the director's office is a printer room (Printer Room), and that the user will reach an exit (To Exit) when the user moves from the current position and turns left.

Figure 7:
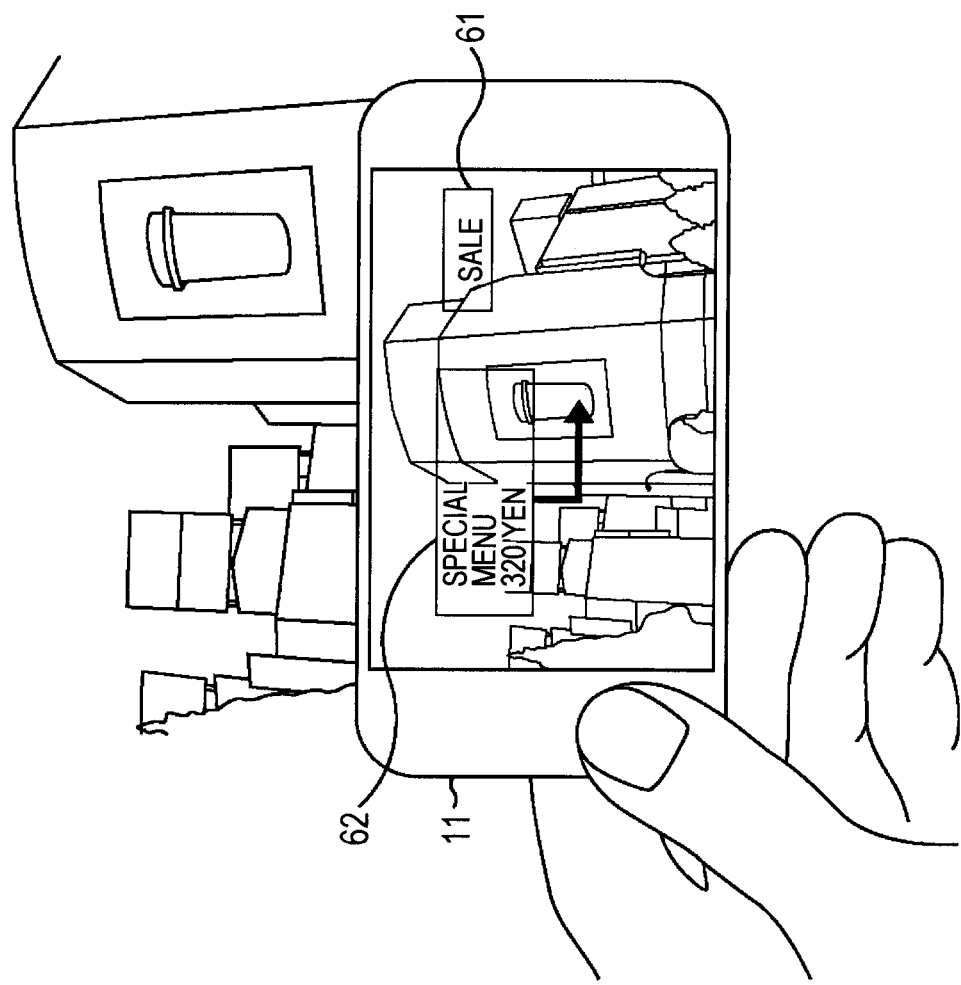
FIG. 7 is an illustration for explaining another example of display in which overlay information items are superimposed on a captured image.

FIG. 7 is an illustration for explaining another example of display in which overlay information items are superimposed on a captured image.

In the example illustrated in FIG. 7, the user is outdoors and in a town. Furthermore, navigation information items are employed as overlay information items. More specifically, for example, a store information item and a detailed information item concerning an advertisement are used as overlay information items. In the example, the user captures an image of buildings in the town using the mobile terminal 11 to obtain a captured image as a result. A store information item 61 of "SALE" and a detailed information item 62 concerning an advertisement of "SPECIAL MENU 320 YEN", which are overlay information items, are displayed so as to be superimposed on the captured image. Accordingly, the user can visually recognize the store information item 61 and the detailed information item 62 concerning the advertisement as if the store information item 61 and the detailed information item 62 concerning the advertisement were directly posted on a building and the advertisement in the real world, and can take action. Because the overlay information items are displayed, the user can acquire information items indicating that merchandise is on sale (SALE) in a store inside the building in front of the user, and that a drink shown in the advertisement on the wall of the building is 320 yen (SPECIAL MENU 320 YEN).

Overlay-Information Provision Process Performed by Information Providing Server 14

Next, a process (hereinafter, referred to as an "overlay-information provision process") that is performed by the information providing server 14 will be described with reference to FIG. 8.

Figure 8:
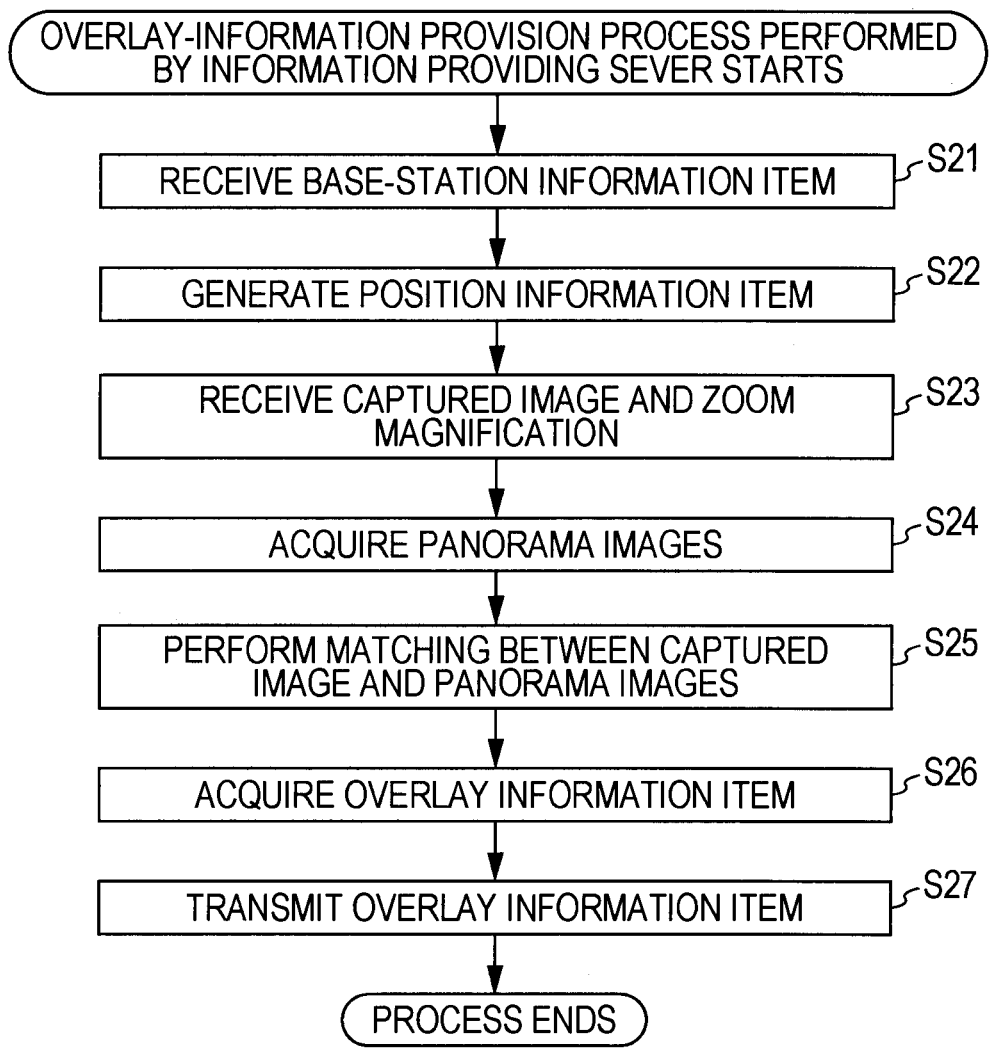
FIG. 8 is a flowchart for explaining an example of an overlay-information provision process performed by the information providing sever.

FIG. 8 is a flowchart for explaining an example of the overlay-information provision process performed by the information providing server 14.

In the above-described process in step S2 illustrated in FIG. 4, when the base-station information item concerning the base station 12-K that is closest to the mobile terminal 11 is transmitted from the mobile terminal 11, in step S21, the communication unit 31 receives the base-station information item.

In step S22, the position-information generating unit 32 serving as recognizing means generates a position information item on the basis of the received base-station information item. In other words, as described above, an installation position that corresponds to the received base-station ID and that is stored is read. A distance from the installation position is calculated on the basis of the received electric field of the radio wave. Then, a position that is the calculated distance distant from the installation position is calculated as the current position (the predetermined position at which image capture was performed) of the mobile terminal 11.

Furthermore, as described above, in the process in step S5 illustrated in FIG. 4, the captured image and the zoom magnification are transmitted from the mobile terminal 11.

Accordingly, in step S23, the communication unit 31 receives the captured image and the zoom magnification. Note that, when the communication unit 31 receives no captured image and no zoom magnification within a fixed time, it is determined that a certain error occurs, and the overlay-information provision process is forcibly terminated.

In step S24, the retrieving unit 33 retrieves panorama images in a layer corresponding to the received zoom magnification from among the panorama images that correspond to the current position indicated by the position information item and that are stored in the panorama-image storage unit 34, thereby acquiring panorama images that are retrieved images to be compared with the captured image.

Note that, when the mobile terminal 11 has a geomagnetic sensor therein and has a function of detecting an image-capture direction, a direction information item concerning the image-capture direction can be transmitted to the information providing server 14 in step S5 illustrated in FIG. 4. In this case, the information providing server 14 receives the direction information item in step S23, and uses only the panorama images that were captured from the image-capture direction indicated by the received direction information item as the retrieved images. Accordingly, because the panorama images are narrowed down from the panorama images that were captured with a 360-degree angle to the panorama images that were captured from the image-capture direction, the time taken to perform the matching process can be reduced.

In step S25, the retrieving unit 33 performs matching between the captured image and the panorama images. In other words, as described above, a panorama image that is most similar to the captured image is detected as a matching image by comparing feature points with each other.

In step S26, the overlay-information acquisition unit 35, which is configured as providing means together with the communication unit 31, acquires an overlay information item on the basis of a matching result that is obtained by the retrieving unit 33. In other words, an overlay information item that is associated with the matching image among the panorama images stored in the panorama-image storage unit 34 is acquired.

Here, specific examples of overlay information items that are associated with panorama images will be described with reference to FIG. 9.

FIG. 9 is a table for explaining specific examples of overlay information items that are associated with panorama images.

In the panorama-image storage unit 34, a plurality of panorama images PV1-1, PV1-2, PV1-3, . . . , PV5-1, PV5-2, PV5-3, . . . , which were captured with different zoom magnifications at a plurality of positions in the real world, and overlay information items, each of which is associated with a corresponding one of the panorama images, are stored. In the first embodiment, the panorama images PV1-1, PV1-2, and PV1-3 that were captured at a first position with first to third zoom magnifications which are three different zoom magnifications are stored together with overlay information items, each of which is associated with a corresponding one of the panorama images. Furthermore, the panorama images PV5-1, PV5-2, and PV5-3 that were captured at a fifth position with the first to third zoom magnifications which are three different zoom magnifications are stored together with overlay information items, each of which is associated with a corresponding one of the panorama images. Similarly, for other positions, the panorama images and overlay information items associated therewith are stored. Note that, regarding each of the first to third zoom magnifications, the same value is used as the zoom magnification that was used at each of the positions.

In the example illustrated in FIG. 9, an overlay information item of "Bank A business hours OO . . . " is associated with the panorama image PV1-1 that was captured with the first zoom magnification at the first position. An overlay information item is associated with each of the panorama images PV1-2 and PV1-3 that were captured with the second and third zoom magnifications, respectively, at the first position. Furthermore, an overlay information item of "Business hours OO the number of sheets XX . . . " is associated with the panorama image PV5-1 that was captured with the first zoom magnification at the fifth position which is different from the first position. Moreover, an overlay information item of "OO burger X yen OX burger Z yen OY burger Y yen . . . " is associated with the panorama image PV5-2 that was captured with the second zoom magnification at the fifth position.

In step S27, the communication unit 31, which is configured as the providing means together with the overlay-information acquisition unit 35, transmits the overlay information item. In other words, the communication unit 31 provides the overlay information item, which has been acquired by the overlay-information acquisition unit 35 in step S26, for the mobile terminal 11.

In this manner, as described above, the mobile terminal 11 receives the overlay information item. The mobile terminal 11 combines the provided overlay information item with the captured image to obtain a combined image, and displays the combined image (see steps S6 to S8 illustrated in FIG. 4).

As described above, the overlay-information provision process performed by the information providing server 14 finishes.

Examples in which Overlay Information Item is Displayed

Figure 10A:
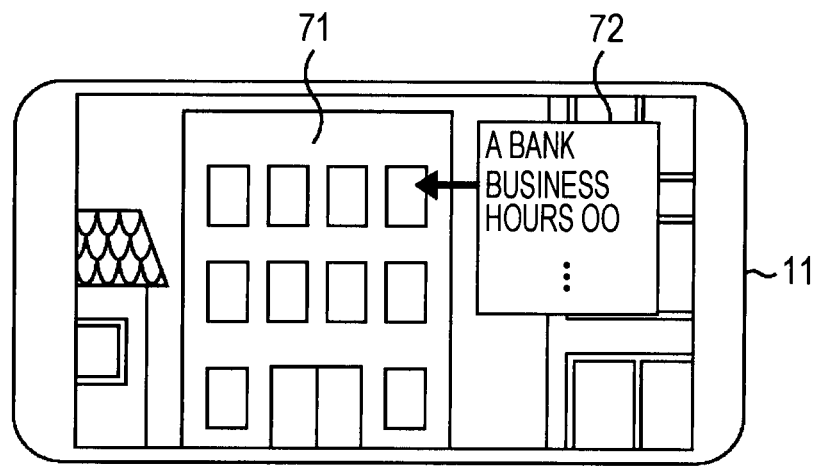
FIGS. 10A to 10C are illustrations for explaining examples of display in which an overlay information item differs with a zoom magnification.
Figure 10B:
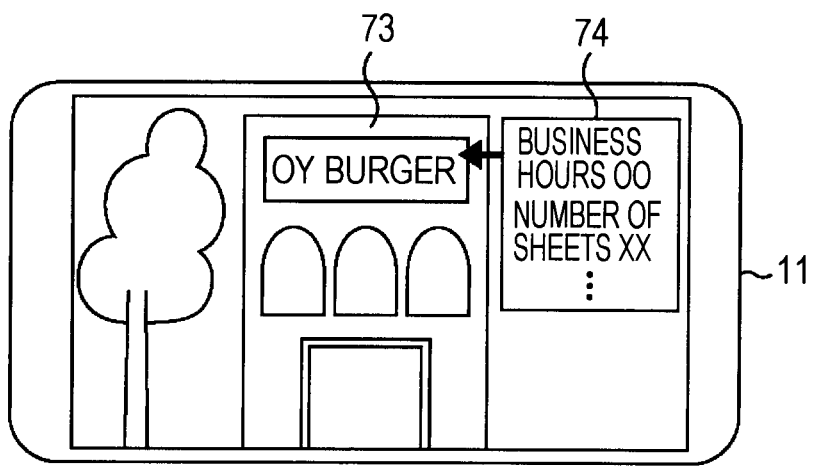
Figure 10C:
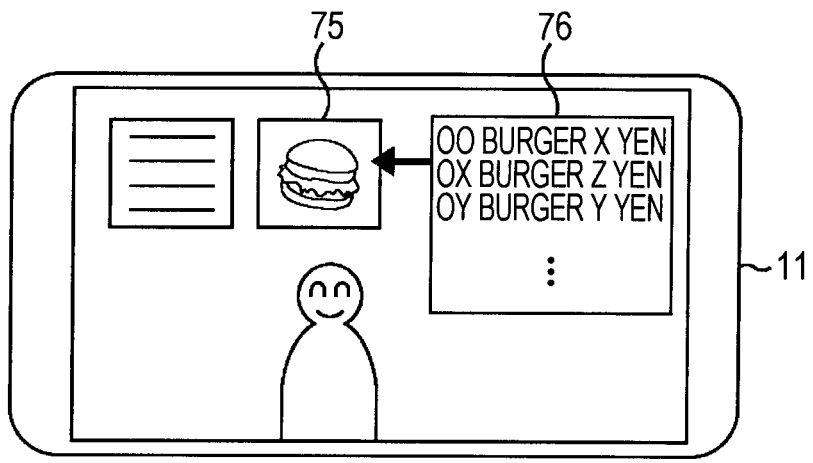

FIGS. 10A to 10C illustrate examples in which an overlay information item is superimposed on a captured image, and are illustrations of examples of display in which an overlay information item differs with the zoom magnification.

In the examples illustrated in FIGS. 10A and 10C, the user is in a town. Furthermore, navigation information items are employed as overlay information items. More specifically, for example, a detailed information item concerning a store and a detailed information item concerning the inside of the store are employed as overlay information items.

In the example illustrated in FIG. 10A, the user captures an image of an object including a building 71 using the mobile terminal 11 at a predetermined position in the town to obtain a captured image as a result. A detailed information item 72 concerning a store of the building 17 is displayed as an overlay information item so as to be superimposed on the captured image. Accordingly, because the detailed information item 72 concerning the store of the building 17 that is an overlay information item is displayed, the user can acquire an information item indicating that the building 71 whose image has been captured by the user is Bank A and that the business hours are OO, and so forth.

In the example illustrated in FIG. 10B, the user captures an image of an object including an OY burger shop 73 at a predetermined position, in the town, that is different from the position in the example illustrated in FIG. 10A, and the captured image is displayed. In the example, a detailed information item 74 concerning the OY burger shop 73 is displayed as an overlay information item so as to be superimposed on the captured image that is obtained as a result of image capture. Accordingly, because the detailed information item 74 concerning the OY burger shop 73 that is an overlay information item is displayed, the user can acquire an information item indicating that the business hours of the OY burger shop 73 whose image has been captured by the user are OO and that the number of sheets is XX, and so forth.

Moreover, when the user desires to acquire a detailed information item concerning the OY burger shop 73, which is illustrated in FIG. 10B, the user captures an image of the OY burger shop 73 using the mobile terminal 11 with a higher zoom magnification to obtain a captured image as a result. The captured image is displayed as illustrated in FIG. 10C.

In the example illustrated in FIG. 10C, an image of a state of the inside of the OY burger shop 73 has been captured through a window of the OY burger shop 73, and the captured image is displayed. A detailed information item 76 concerning a photograph 75 of a burger that is a portion of the captured image and that is displayed inside the OY burger shop 73 is displayed as an overlay information item so as to be superimposed on the captured image. Accordingly, because the detailed information item 76 that is an overlay information item associated with the photograph 75 of the burger which is a portion of the captured image is displayed, the user can acquire a menu information item indicating that, regarding prices of burgers of the OY burger shop 73 whose image has been captured by the user, OO burger X yen, OY burger Z yen, and OY burger Y yen, and so forth.

In this manner, when there is a target whose more detailed information item the user desires to acquire in a captured image, the user captures an image of the target with a higher zoom magnification. Then, an overlay information item that is associated with the captured image for the zoom magnification, the captured image being obtained as a result of capturing an image of the target with the higher zoom magnification, is displayed so as to be superimposed on the captured image. Accordingly, the user can acquire a more detailed information item concerning the target whose more detailed information item the user desires to acquire in the captured image.

As described above, the panorama images that are targets to be subjected to the matching process using the captured image are narrowed down by utilizing position recognition using the wireless LAN, whereby the following positive effects can be obtained. In other words, it is not necessary to compare, with the captured image, all of the plurality of panorama images that are obtained as results of individually capturing images at the plurality of positions. Accordingly, the time taken to perform the matching process can be reduced. As a result, a time taken to display the overlay information item in such a manner that the overlay information item is superimposed on the captured image can also be reduced. Additionally, the matching accuracy is improved. The accuracy with which an overlay information item to be superimposed on the captured image is determined is improved with an improvement in the matching accuracy.

Moreover, when narrowing down of the panorama images that are targets to be subjected to the matching process using the captured image is performed by utilizing position recognition using the wireless LAN, sensing means that detects and collects various types of information items which are necessary for the mobile terminal 11 is only the camera and the wireless LAN. In a mobile terminal that has been utilized in recent years, such as a smart phone, a camera and a wireless communication function are typically implemented. Accordingly, when narrowing down of the panorama images that are targets to be subjected to the matching process using the captured image is performed by utilizing position recognition using the wireless LAN, it is not necessary to add new sensing means, such as another sensor, to the mobile terminal. Furthermore, because the wireless LAN that can also be used indoors is used for position recognition, few restrictions are imposed on the range of use.

2. Second Embodiment

In the first embodiment described above, an information item that is associated with a panorama image which is most similar to a captured image is displayed as an overlay information item. In a second embodiment, an information item that is associated with the entirety of or a portion of an image of a poster or the like which is a captured image is displayed as an overlay information item.

A configuration of an information providing system according to the second embodiment is basically similar to the configuration of the information providing system 1 according to the first embodiment, which is illustrated in FIG. 1. In other words, similarly to the configuration of the information providing system 1 according to the first embodiment, which is illustrated in FIG. 1, also in the information providing system according to the second embodiment, a mobile terminal 11 and an information providing server 14 are connected to each other via a base station 12 and a network 13.
Example of Configuration of Mobile Terminal 11

FIG. 11 is a functional block diagram of an example of a functional configuration of the mobile terminal 11 included in the information providing system according to the second embodiment.

The mobile terminal 11 illustrated in FIG. 11 includes an image capturing unit 21, a captured-image acquisition unit 22, a base-station-information acquisition unit 23, a display control unit 25, a display unit 26, a communication unit 27, and a time-information acquisition unit 101.

A basic function of each of the image capturing unit 21, the captured-image acquisition unit 22, the base-station-information acquisition unit 23, the display control unit 25, the display unit 26, and the communication unit 27 of the mobile terminal 11 illustrated in FIG. 11 is similar to the function of a corresponding one of the image capturing unit 21, the captured-image acquisition unit 22, the base-station-information acquisition unit 23, the display control unit 25, the display unit 26, and the communication unit 27 of the mobile terminal 11 illustrated in FIG. 2. Accordingly, hereinafter, regarding the mobile terminal 11 illustrated in FIG. 11, a description of elements thereof that are identical to those of the mobile terminal 11 illustrated in FIG. 2 is omitted, and only the differences between the mobile terminal 11 illustrated in FIG. 11 and the mobile terminal 11 illustrated in FIG. 2 are described.

An object whose image is captured by the image capturing unit 21 of the mobile terminal 11 illustrated in FIG. 2 is a landscape, in the real world, at the position at which the mobile terminal 11 exists. On the other hand, an object whose image is captured by the mobile terminal 11 illustrated in FIG. 11 is a poster that is pasted on a street wall or digital signage that is displayed on a display. In this case, the entirety of the poster or digital signage (hereinafter, referred to as a "display medium") may be an object whose image is captured. Alternatively, a portion of the display medium may be an object whose image is captured. A portion of the display medium may be, for example, a two-dimensional barcode, or a logotype of a company name and so forth that are included in the display medium. Note that, hereinafter, a logotype of a company name and so forth are collectively referred to as a "marker".

In other words, a captured image that is acquired by the captured-image acquisition unit 22 of the mobile terminal 11 illustrated in FIG. 2 is an image showing a landscape, in a real world, at the position at which the mobile terminal 11 exists. On the other hand, a captured image that is acquired by the captured-image acquisition unit 22 of the mobile terminal 11 illustrated in FIG. 11 is an image showing the entirety of or a portion of a display medium.

In the mobile terminal 11 illustrated in FIG. 11, a functional block corresponding to the zoom-magnification acquisition unit 24 of the mobile terminal 11 illustrated in FIG. 2 is not provided. On the other hand, the time-information acquisition unit 101 that does not exist in the mobile terminal 11 illustrated in FIG. 2 is provided.

The time-information acquisition unit 101 acquires a time information item concerning capture of an image of a display medium, such as an image-capture start time or an image-capture end time. The time information item, together with a captured image and a base-station information item, is provided from the communication unit 27 to the information providing server 14.

Example of Configuration of Information Providing Server 14

FIG. 12 is a functional block diagram of an example of a functional configuration of the information providing server 14 included in the information providing system according to the second embodiment.

The information providing server 14 illustrated in FIG. 12 includes a communication unit 31, a position-information generating unit 32, an overlay-information acquisition unit 35, a retrieving unit 121, and a content storage unit 122.

A basic function of each of the communication unit 31, the position-information generating unit 32, and the overlay-information acquisition unit 35 of the information providing server 14 illustrated in FIG. 12 is similar to the function of a corresponding one of the communication unit 31, the position-information generating unit 32, and the overlay-information acquisition unit 35 of the information providing server 14 illustrated in FIG. 3. Accordingly, hereinafter, regarding the information providing server 14 illustrated in FIG. 12, a description of elements thereof that are identical to those of the information providing server 14 illustrated in FIG. 3 is omitted, and only the differences between the information providing server 14 illustrated in FIG. 12 and the information providing server 14 illustrated in FIG. 3 are described.

The retrieving unit 121 performs a retrieval process on the basis of a captured image that is received by the communication unit 31 to determine which display medium is shown by the captured image. A retrieval scheme used for the retrieval process is not particularly limited. However, for example, in the second embodiment, some retrieval schemes given below are employed singly or in combination.

In other words, for example, images of the entireties of a plurality types of display media (images having patterns of display media, hereinafter, referred to as "poster images") are prepared and registered in advance. In this case, a retrieval scheme can be employed, in which a type that coincides with a type of captured image (a captured image of an entirety of a poster or digital signage) is recognized among the plurality of types of poster images, thereby retrieving a display medium of the recognized type. Note that a recognition scheme (matching scheme) for recognizing that images coincide with each other is not particularly limited. For example, a recognition scheme can be employed, in which image feature points of individual areas of one of two images that coincide with image feature points of the other image are detected as coincident points, and in which whether or not the two images coincide with each other is recognized on the basis of a result of detection.

Furthermore, for example, a plurality of types of markers are prepared and registered in advance. In this case, a retrieval scheme can be employed, in which a type that coincides with a type of marker included in a captured image is recognized among the plurality of types of markers, thereby retrieving a marker of the recognized type. In this case, a recognition scheme is not particularly limited. For example, the recognition scheme that is described in the immediately previous paragraph can also be employed.

Moreover, for example, a predetermined display medium or an information item by which the predetermined display medium can be identified is associated with each of a plurality of types of two-dimensional barcodes in advance. In this case, a retrieval scheme can be employed, in which a two-dimensional barcode included in a captured image is analyzed, and in which a display medium associated with the two-dimensional barcode is retrieved on the basis of a result of analysis.

A plurality of content items are stored in the content storage unit 122. A display medium, a position information item, and a time information item are associated with each of the content items.

The overlay-information acquisition unit 35 acquires, from the content storage unit 122, a content item that is associated with a display medium, which has been retrieved by the retrieving unit 121, a position information item, which has been generated by the position-information generating unit 32, and a time information item, which has been received by the communication unit 31. In other words, the overlay-information acquisition unit 35 acquires the content item as an overlay information item.

The content item that is used as an overlay information item is transmitted via the communication unit 31 to the mobile terminal 11. Accordingly, in the mobile terminal 11, the overlay information item is displayed so as to be superimposed on the captured image or singly displayed.

Various information items can be employed as overlay information items. Accordingly, various types of service can be provided for the user.

For example, navigation information items can be employed as overlay information items. More specifically, an information item concerning transport to a tourist attraction that is displayed on a display medium can be employed as an overlay information item. In this case, using the mobile terminal 11 operated by the user, the user can capture an image of a display medium including an image of a specific tourist attraction or capture an image of display medium including, as a portion thereof, a marker or two-dimensional barcode by which the specific tourist attraction can be recognized. Then, on the display unit 26 of the mobile terminal 11, not only the image of the specific tourist attraction is displayed, but also, for example, an information item concerning transport from an image-capture position (a place at which the display medium exists) to the specific tourist attraction is displayed as an overlay information item so as to be superimposed on the image of the specific tourist attraction. Alternatively, only the information concerning transport is displayed. Accordingly, the user can easily and visually recognize the information concerning transport from the image-capture position (the place at which the user exists) to the specific tourist attraction.

Note that, although the content items are associated with the display media in the above-described example, the association of the content items are not limited to the above-described example. The content items can be associated with markers or two-dimensional barcodes. In this case, the retrieving unit 121 can retrieve a marker or a two-dimensional barcode included in a captured image.

Furthermore, places at which individual functional blocks of the functional block diagram of the mobile terminal 11 illustrated in FIG. 11 and of the functional block diagram of the information providing server 14 illustrated in FIG. 12 exist may be located in the mobile terminal 11, in the information providing server 14, or in an information processing apparatus (not illustrated) on the network.

Overlay-Information Display Process Performed by Mobile Terminal 11

Next, an overlay-information display process that is performed by the mobile terminal 11 will be described with reference to FIG. 13.

Figure 13:
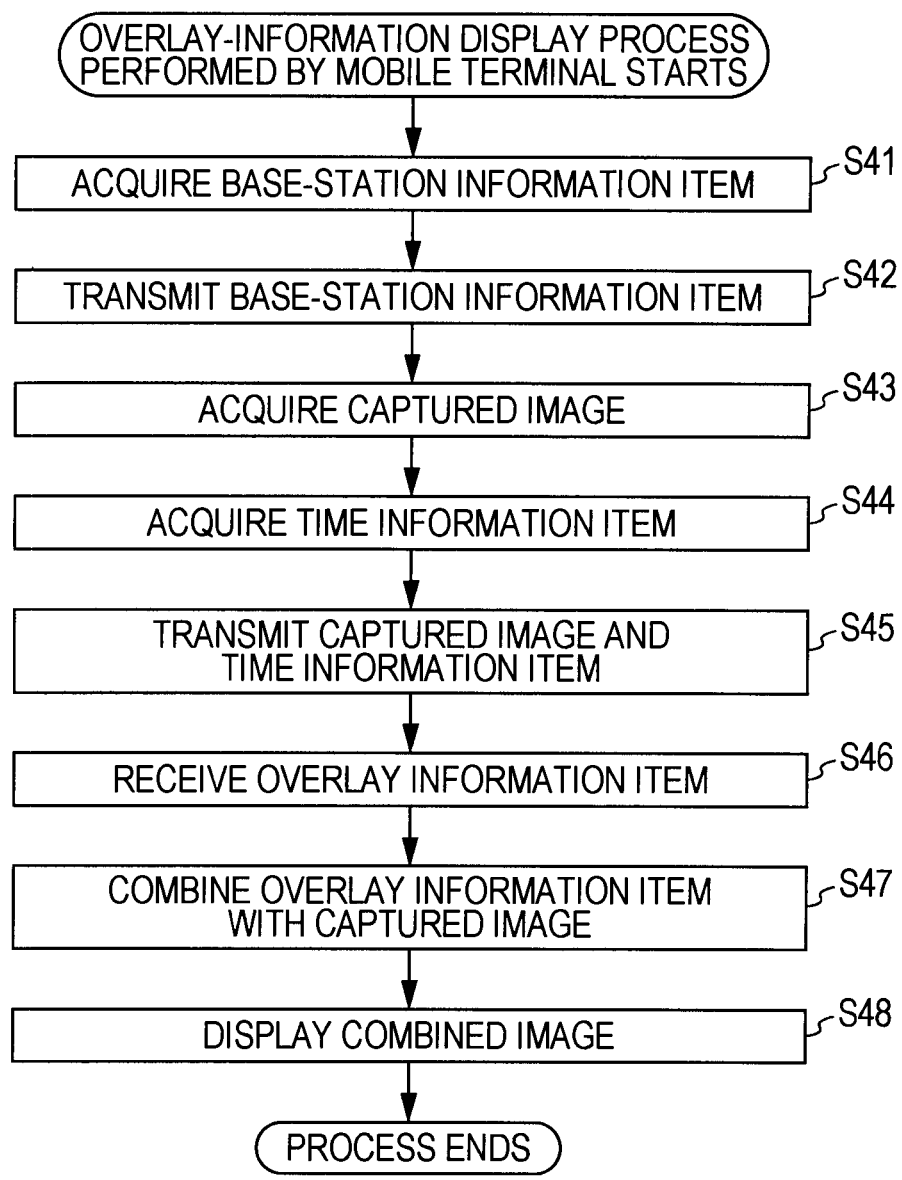
FIG. 13 is a flowchart for explaining an example of an overlay-information display process that is performed by the mobile terminal.

FIG. 13 is a flowchart for explaining an example of the overlay-information display process that is performed by the mobile terminal 11.

Each of processes in steps S41 to S43 is basically similar to a corresponding one of the processes in steps S1 to S3 illustrated in FIG. 4. Accordingly, a description of each of the processes is omitted.

As a result of the process in step S43, as described above, an image of an entirety of or a portion of a display medium is acquired as a captured image by the captured-image acquisition unit 22.

Figure 14A:
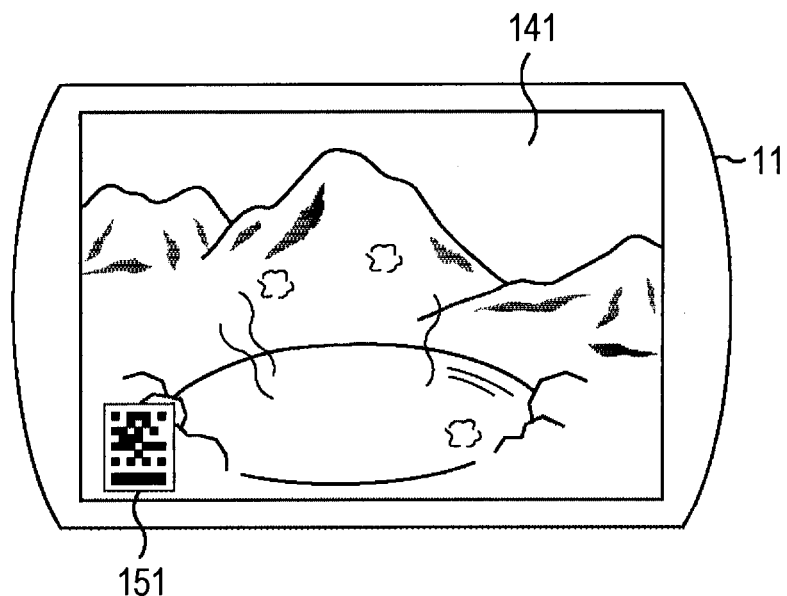
FIGS. 14A and 14B are illustrations of examples of captured images.
Figure 14B:
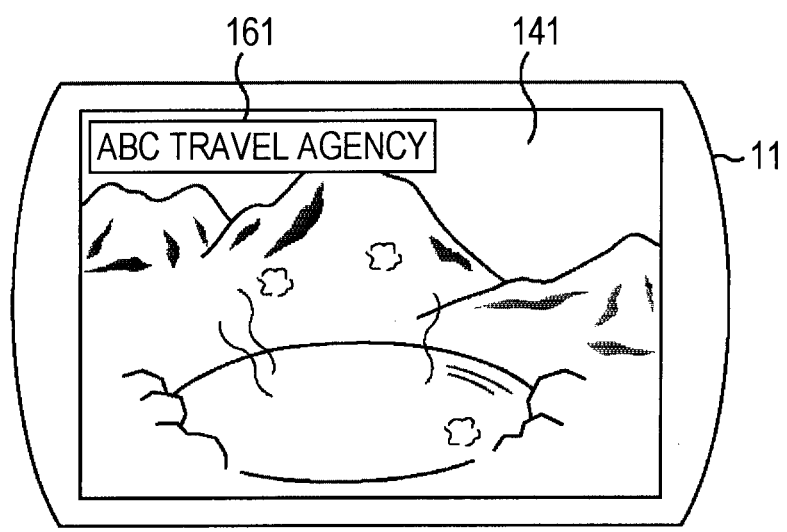

FIGS. 14A and 14B are illustrations of examples of captured images that are acquired by the captured-image acquisition unit 22.

FIG. 14A is an illustration of a captured image that is obtained as a result of capturing an image of a display medium, on which a poster image 141 showing a specific spa place is displayed, using the mobile terminal 11 operated by the user. A two-dimensional barcode 151 is included in the display medium. In FIG. 14A, the entirety of the display medium is an object whose image is captured. However, a portion of the display medium, i.e., only the two-dimensional barcode 151, may be an object whose image is captured. As the two-dimensional barcode 151, for example, CyberCode® that was developed by the present applicant can be employed.

FIG. 14B is an illustration of a captured image that is obtained as a result of capturing an image of a display medium, on which the poster image 141 showing the specific spa place is displayed, using the mobile terminal 11 operated by the user. A logotype 161 of ABC travel agency is included in the display medium. In FIG. 14B, the entirety of the display medium is an object whose image is captured. However, a portion of the display medium, i.e., only the logotype 161 of ABC travel agency, may be an object whose image is captured.

In step S44, the time-information acquisition unit 101 acquires a time information item concerning a time at which the captured image was captured by the image capturing unit 21. For example, year, month, day, hour, minute, and second are acquired.

In step S45, the communication unit 27 transmits the captured image, which has been acquired in step S43, and the time information item, which has been acquired in step S44, to the information providing server 14.

Then, the information providing server 14 receives the captured image and the time information item, and acquires a predetermined content item using the captured image, the time information item, and the above-described position information item. After that, the information providing server 14 transmits the acquired content item as an overlay information item to the mobile terminal 11 (see steps S65 and S66 illustrated in FIG. 16 that is described below).

In the mobile terminal 11, in step S46, the communication unit 27 receives the overlay information item that has been transmitted from the information providing server 14. Note that, when the communication unit 27 receives no overlay information item within a fixed time after the communication unit 27 has transmitted the captured image, it is determined that a certain error occurs, and the overlay-information display process illustrated in FIG. 13 is forcibly terminated.

Each of processes in steps S47 and S48 is basically similar to a corresponding one of the processes in steps S7 and S8 illustrated in FIG. 4. In other words, the overlay information item is combined with the captured image to obtain a combined image, and the combined image is displayed.

Accordingly, the overlay-information display process that is illustrated in FIG. 13 and that is performed by the mobile terminal 11 finishes.

Here, specific examples of the processes in steps S47 and S48 illustrated in FIG. 13 will be described with reference to FIGS. 15A and 15B.

Figure 15A:
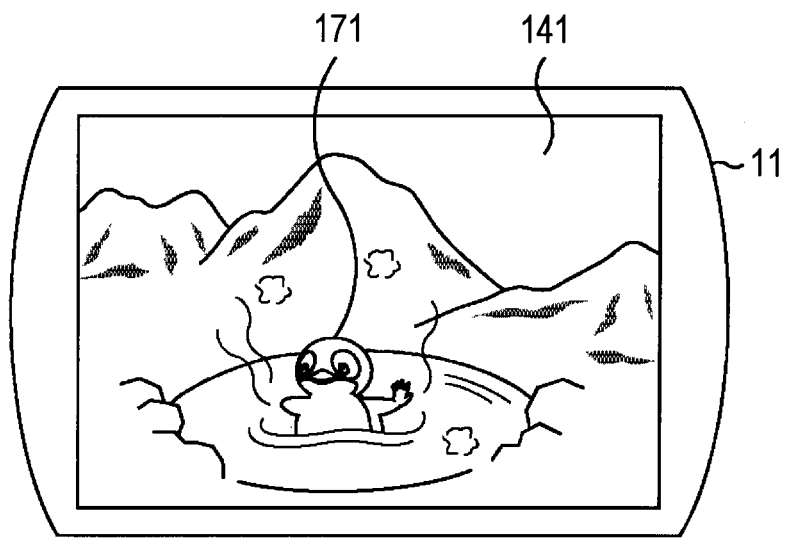
FIGS. 15A and 15B are illustrations of examples of display in which an overlay information item differs with an image-capture position or an image-capture time.
Figure 15B:
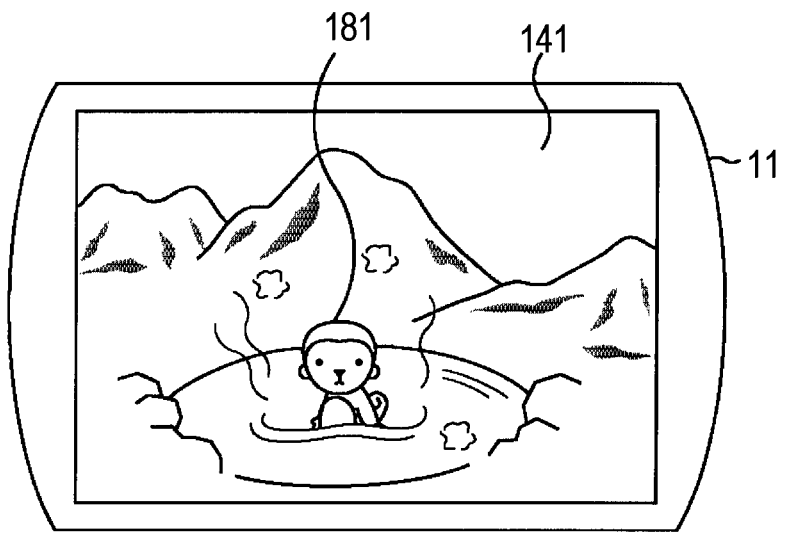

FIGS. 15A and 15B are illustrations of examples of display in which an overlay information item differs with the image-capture position or the image-capture time.

Images of a display medium on which the poster image 141 is displayed were individually captured in different conditions of the image-capture position and the image-capture time to obtain captured images as results. In FIGS. 15A and 15B, overlay information items are displayed so as to be superimposed on the captured images. In the example illustrated in FIG. 15A, an image 171 of a penguin is displayed as an overlay information item so as to be superimposed on the corresponding captured image. Furthermore, in the example illustrated in FIG. 15B, an image 181 of a monkey is displayed as an overlay information item so as to be superimposed on the corresponding captured image. The examples indicate that, even when captured images are the same as each other, in a case in which image-capture positions (places at which display media exist) or image-capture times at which the user captured the images are different from each other, content items different from each other are provided as overlay information items. Accordingly, even when image captures are the same as each other, the user can acquire an overlay information item that varies with the image-capture position or the image-capture time. In other words, a more appropriate overlay information item that differs with the position or the time is displayed.

Overlay Information Provision Process Performed by Information Providing Server 14

Next, an overlay-information provision process that is performed by the information providing server 14 will be described with reference to FIG. 16.

Figure 16:
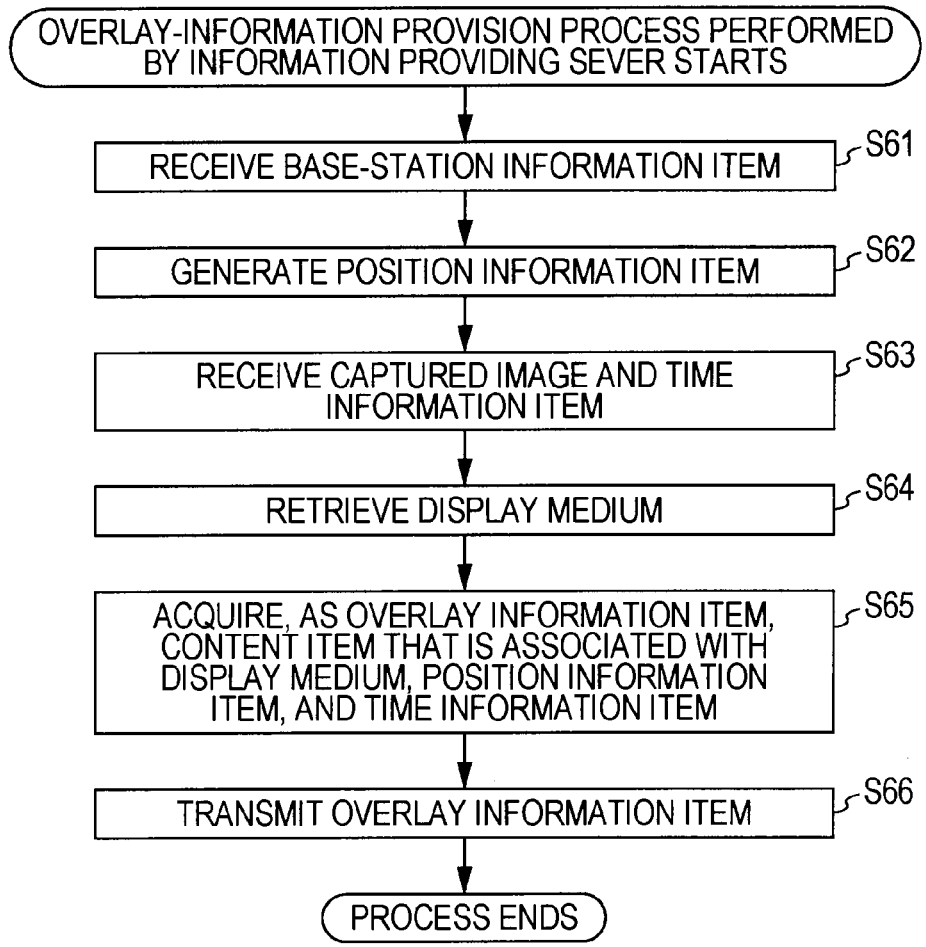
FIG. 16 is a flowchart for explaining an example of an overlay-information provision process that is performed by the information providing server.

FIG. 16 is a flowchart for explaining an example of the overlay-information provision process that is performed by the information providing server 14 in correspondence with the processes which are illustrated in FIG. 13 and which are performed by the mobile terminal 11.

Each of processes in steps S61 and S62 is basically similar to a corresponding one of the processes in steps S21 and S22 illustrated in FIG. 8. In other words, a base-station information item is acquired, and a position information item is generated.

As described above, in the process in step S45 illustrated in FIG. 13, the captured image and the time information item are transmitted from the mobile terminal 11.

Accordingly, in step S63, the communication unit 31 receives the captured image and the time information item. Note that, when the communication unit 31 receives no captured image and no zoom magnification within a fixed time, it is determined that a certain error occurs, and the overlay-information provision process illustrated in FIG. 16 is forcibly terminated.

In step S64, the retrieving unit 121 retrieves the display medium included in the captured image.

In step S65, the overlay-information acquisition unit 35, which is configured as providing means together with the communication unit 31, acquires, as an overlay information item, a content item that is associated with the display medium, which is obtained as a result of the retrieval process performed by the retrieving unit 121, the position information item, and the time information item.

In step S66, the communication unit 31, which is configured as the providing means together with the overlay-information acquisition unit 35, transmits the overlay information item to the mobile terminal 11.

In this manner, as described above, the mobile terminal 11 receives the overlay information item. The mobile terminal 11 combines the provided overlay information item with the captured image to obtain a combined image, and displays the combined image (see steps S46 to S48 illustrated in FIG. 13).

Accordingly, the overlay-information provision process that is illustrated in FIG. 16 and that is performed by the information providing server 14 finishes.

Note that a content item that is associated with a display medium, a position information item, and a time information item is not limited to an overlay information item, and may be an information item that can be presented on the mobile terminal 11, such as a uniform resource locator (URL).

Example of Information Item Associated with Display Medium

Figure 17:
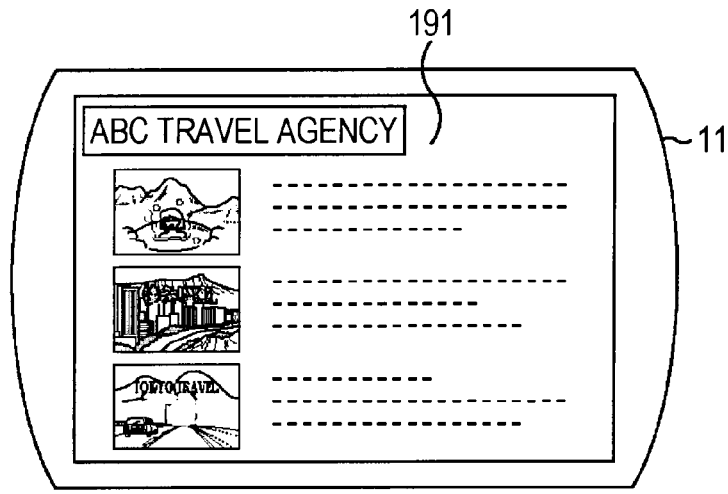
FIG. 17 is an illustration of an example of an information item that is associated with a display medium.

FIG. 17 is an illustration of an example of an information item that is displayed on the mobile terminal 11 as described above and that is associated with a display medium.

In the example illustrated in FIG. 17, a site 191 of ABC travel agency is displayed on the mobile terminal 11. The user can acquire a URL of ABC travel agency as an overlay information item from the information providing server 14, and can access a site having the acquired URL. Accordingly, the user can acquire a travel information item concerning a travel to a specific spa place that is included in a captured image and related information items. Furthermore, a company or the like employs a URL of the company or the like as an overlay information item, whereby the company or the like can display a sales-promotion information item to the user.

As described above, in the first and second embodiments, a position information is generated on the information providing server 14 side. However, a position information may be generated on the mobile terminal 11 side. In this case, the information providing server 14 recognizes the image-capture position on the basis of the position information item that is transmitted from the mobile terminal 11.

The present invention can be applied to a case of providing an overlay information item for a mobile terminal having a camera and a communication function using a wireless LAN. Examples of the mobile terminal include, in addition to a mobile phone and a smart phone, an electronic organizer, a personal digital assistant, a head-mounted display, a mobile personal computer, and so forth.

Application of Present Invention to Programs

The series of processes described above can be performed by hardware or software.

In such a case, for example, a personal computer illustrated in FIG. 18 may be employed as at least one portion of the above-described information processing apparatus.

In FIG. 18, a central processing unit (CPU) 201 performs various types of processes in accordance with a program that is recorded in a read-only memory (ROM) 202. Furthermore, the CPU 201 performs various types of processes in accordance with a program that is loaded from a storage unit 208 to a random-access memory (RAM) 203. Additionally, in the RAM 203, data that is necessary for performance of various types of processes with the CPU 201 is also stored as appropriate.

The CPU 201, the ROM 202, and the RAM 203 are connected to one another via a bus 204. An input/output interface 205 is also connected to the bus 204.

An input unit 206 that is configured using a keyboard, a mouse, and so forth, and an output unit 207 that is configured using a display and so forth are connected to the input/output interface 205. Furthermore, a storage unit 208 that is configured using a hard disk, and a communication unit 209 that is configured using a modem, a terminal adaptor, and so forth are connected to the input/output interface 205. The communication unit 209 controls communication that is performed between the personal computer and other apparatuses (not illustrated) via networks including the Internet.

Furthermore, a drive 210 is connected to the input/output interface 205 as necessary. A removal medium 211 that is configured using a magnetic disk, an optical disk, a magneto-optical disk, a semiconductor memory, or the like is mounted to the drive 210 as appropriate. A computer program that is read from the removal medium 211 is installed in the storage unit 208 as necessary.

When the series of processes is performed by software, programs constituting the software are installed, from a network or a recording medium, in a computer that is incorporated in dedicated hardware or installed in, for example, a general-purpose computer. The general-purpose computer can perform various types of functions by installation of various types of programs.

As illustrated in FIG. 18, the recording medium including the programs is configured using the removal medium (packaged medium) 211 which is distributed separately from the body of an apparatus in order to provide the programs for a user and on which the programs are recorded. The removal medium 211 is configured using a magnetic disk (including a Floppy® disk), an optical disk (including a compact disk-read only memory (CD-ROM) and a digital versatile disk (DVD)), a magneto-optical disk (including a mini-disk (MD)), or a semiconductor memory. Alternatively, the recording medium including the programs may be configured using, for example, the ROM 202 or a hard disk included in the storage unit 208, which are provided for the user in a state in which they are embedded in the body of an apparatus in advance.

Note that, in the present specification, steps defining the programs recorded on the recording medium may include processes that are sequentially performed in the order of the steps, and may also include processes that are performed in parallel or individually, not necessarily sequentially.

The present application contains subject matter related to that disclosed in Japanese Priority Patent Application JP 2009-202264 filed in the Japan Patent Office on Sep. 2, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information providing method comprising:
   a recognition step of recognizing an image-capture position, in the real world, at which a captured image was captured by communicating with a base-station with a unique base-station identification associated with a given installation position;

a retrieval step of retrieving information that is associated with the image-capture position, which has been recognized in the recognition step, and the captured image; and a provision step of providing the information, which has been retrieved in the retrieval step, as overlay information that is to be displayed so as to be superimposed on the captured image, where more detailed overlay-information is provided for higher zoom magnification.

2. The information providing method according to claim 1, wherein the information is further associated with a time, and wherein, in the retrieval step, the information is retrieved on the basis of a time at which the captured image was captured, in addition to the image-capture position and the captured image.

3. The information providing method according to claim 1, wherein the retrieval step includes an image retrieval step of retrieving images that are to be compared with the captured image, as retrieved images, from among a plurality of images corresponding to individual positions in the real world, on the basis of the image-capture position that has been recognized in the recognition step, a comparison step of comparing the retrieved images with the captured image, and an information retrieval step of retrieving, as the information, information that is associated with one of the retrieved images, the retrieved image coinciding with the captured image as a result of comparison in the comparison step.

4. The information providing method according to claim 3, wherein, in the recognition step, in addition to the image-capture position, an image-capture direction from which the captured image was captured is recognized, and wherein, in the image retrieval step, images are retrieved as the retrieved images on the basis of the image-capture direction in addition to the image-capture position.

5. The information providing method according to claim 4, wherein the captured image is an image that is obtained by performing image capture at the image-capture position in the real world, and wherein, in the image retrieval step, images are retrieved as the retrieved images on the basis of each zoom magnification with which the captured image was captured, in addition to the image-capture position.

6. An information providing apparatus comprising:

recognizing means for recognizing an image-capture position, in the real world, at which a captured image was captured by communicating with a base-station with a unique base-station identification associated with a given installation position;

retrieving means for retrieving information that is associated with the image-capture position, which has been recognized by the recognizing means, and the captured image; and providing means for providing the information, which has been retrieved by the retrieving means, as overlay information that is to be displayed so as to be superimposed on the captured image, where more detailed overlay-information is provided for a higher zoom magnification.

7. A non-transitory, computer-readable storage medium storing a program for causing a computer to perform a control process, the control process comprising the steps of:

recognizing an image-capture position, in the real world, at which a captured image was captured by communicating with a base-station with a unique base-station identification associated with a given installation position;

retrieving information that is associated with the recognized image-capture position and the captured image; and providing the retrieved information as overlay information that is to be displayed so as to be superimposed on the captured image, where more detailed overlay information is provided for a higher zoom magnification.

8. An information display method comprising:

an image acquisition step of acquiring a captured image that is obtained by performing image capture at an image-capture position in the real world determined by communicating with a base-station with a unique base-station identification associated with a given installation position;

an information acquisition step of acquiring information concerning the image-capture position;

a communication step of transmitting the captured image and the information concerning the image-capture position to an information providing apparatus, and of receiving overlay information that is associated with the captured image and the information concerning the image-capture position from the information providing apparatus, where more detailed overlay-information is provided for a higher zoom magnification; and a display step of displaying the overlay information, which has been received in the communication step, in such a manner that the overlay information is superimposed on the captured image.

9. The information display method according to claim 8, wherein, in the communication step, in addition to the captured image and the information concerning the image-capture position, time information concerning a time at which the captured image was captured is further transmitted to the information providing apparatus, and overlay information that is further associated with the time information in addition to the captured image and the information concerning the image-capture position is received from the information providing apparatus.

10. The information display method according to claim 8, wherein, in the communication step, direction information concerning an image-capture direction from which the captured image was captured is further transmitted to the information providing apparatus.

11. The information display method according to claim 8, further comprising a zoom-magnification acquisition step of acquiring a zoom magnification with which the captured image was captured, wherein, in the communication step, in addition to the captured image and the information concerning the image-capture position, the zoom magnification is further transmitted to the information providing apparatus, and overlay information that is further associated with the zoom magnification in addition to the captured image and the information concerning the image-capture position is received from the information providing apparatus.

12. A mobile terminal comprising:

image acquiring means for acquiring a captured image that is obtained by performing image capture at an image-capture position in the real world determined by communicating with a base-station with a unique base-station identification associated with a given installation position;

information acquiring means for acquiring information concerning the image-capture position;

communicating means for transmitting the captured image and the information concerning the image-capture position to an information providing apparatus, and for receiving overlay information that is associated with the captured image and the information concerning the image-capture position from the information providing apparatus, where more detailed overlay-information is provided for a higher zoom magnification; and display means for displaying the overlay information, which has been received by the communicating means, in such a manner that the overlay information is superimposed on the captured image.

13. A non-transitory, computer-readable storage medium storing a program for causing a computer to perform a control process, the control process comprising the steps of:

acquiring a captured image that is obtained by performing image capture at an image-capture position in the real world determined by communicating with a base-station with a unique base-station identification associated with a given installation position;

acquiring information concerning the image-capture position;

transmitting the captured image and the information concerning the image-capture position to an information providing apparatus, and receiving overlay information that is associated with the captured image and the information concerning the image-capture position from the information providing apparatus, where more detailed overlay-information is provided for a higher zoom magnification; and displaying the received overlay information in such a manner that the overlay information is superimposed on the captured image.

14. An information providing system comprising:

an information providing apparatus configured to provide, for a mobile terminal, overlay information that is to be combined with a captured image; and the mobile terminal configured to combine the overlay information with the captured image to obtain a combined image, and configured to display the combined image, the mobile terminal including image acquiring means for acquiring the captured image that is obtained by performing image capture at an image-capture position in the real world determined by communicating with a base-station with a unique base-station identification associated with a given installation position, display means for displaying the overlay information in such a manner that the overlay information is superimposed on the captured image, and first communicating means for transmitting the captured image and information concerning the image-capture position to the information providing apparatus, and for receiving the overlay information from the information providing apparatus, the information providing apparatus including recognizing means for recognizing the image-capture position on the basis of the information concerning the image-capture position, which has been received from the mobile terminal, retrieving means for retrieving information that is associated with the image-capture position, which has been recognized by the recognizing means, and the captured image, and second communicating means for transmitting, to the mobile terminal, the information, which has been retrieved by the retrieving means, as the overlay information item that is to be displayed so as to be superimposed on the captured image, where more detailed overlay-information is provided for a higher zoom magnification.

15. An information providing apparatus comprising:

a recognizing unit configured to recognize an image-capture position, in the real world, at which a captured image was captured by communicating with a base-station with a unique base-station identification associated with a given installation position;

a retrieving unit configured to retrieve information that is associated with the image-capture position, which has been recognized by the recognizing unit, and the captured image; and a providing unit configured to provide the information, which has been retrieved by the retrieving unit, as overlay information that is to be displayed so as to be superimposed on the captured image, where more detailed overlay-information is provided for a higher zoom magnification.

16. A mobile terminal comprising:

an image acquiring unit configured to acquire a captured image that is obtained by performing image capture at an image-capture position in the real world determined by communicating with a base-station with a unique base-station identification associated with a given installation position;

an information acquiring unit configured to acquire information concerning the image-capture position;

a communicating unit configured to transmit the captured image and the information concerning the image-capture position to an information providing apparatus, and configured to receive overlay information that is associated with the captured image and the information concerning the image-capture position from the information providing apparatus where more detailed overlay-information is provided for a higher zoom magnification; and a display unit configured to display the overlay information, which has been received by the communicating unit, in such a manner that the overlay information is superimposed on the captured image.

17. An information providing system comprising:

an information providing apparatus configured to provide, for a mobile terminal, overlay information that is to be combined with a captured image; and the mobile terminal configured to combine the overlay information with the captured image to obtain a combined image, and configured to display the combined image, the mobile terminal including an image acquiring unit configured to acquire the captured image that is obtained by performing image capture at an image-capture position in the real world determined by communicating with a base-station with a unique base-station identification associated with a given installation position, a display unit configured to display the overlay information in such a manner that the overlay information is superimposed on the captured image, and a first communicating unit configured to transmit the captured image and information concerning the image-capture position to the information providing apparatus, and configured to receive the overlay information from the information providing apparatus, the information providing apparatus including a recognizing unit configured to recognize the image-capture position on the basis of the information concerning the image-capture position, which has been received from the mobile terminal, a retrieving unit configured to retrieve information that is associated with the image-capture position, which has been recognized by the recognizing unit, and the captured image, and a second communicating unit configured to transmit, to the mobile terminal, the information, which has been retrieved by the retrieving unit, as the overlay information item that is to be displayed so as to be superimposed on the captured image, where more detailed overlay-information is provided for a higher zoom magnification.

* * * * *